US012467057B2

(12) United States Patent
Ye

(10) Patent No.: US 12,467,057 B2
(45) Date of Patent: Nov. 11, 2025

(54) METHODS FOR MODIFYING PLASTID GENOMES

(71) Applicant: Monsanto Technology LLC, St. Louis, MO (US)

(72) Inventor: Xudong Ye, Chesterfield, MO (US)

(73) Assignee: Monsanto Technology LLC, St. Louis, MO (US)

( * ) Notice: Subject to any disclaimer, the term of this patent is extended or adjusted under 35 U.S.C. 154(b) by 417 days.

(21) Appl. No.: 17/820,172

(22) Filed: Aug. 16, 2022

(65) Prior Publication Data

US 2023/0159944 A1 May 25, 2023

Related U.S. Application Data

(60) Provisional application No. 63/233,921, filed on Aug. 17, 2021.

(51) Int. Cl.
*C12N 15/82* (2006.01)
*C12N 9/22* (2006.01)

(52) U.S. Cl.
CPC ............ *C12N 15/8214* (2013.01); *C12N 9/22* (2013.01)

(58) Field of Classification Search
None
See application file for complete search history.

(56) References Cited

U.S. PATENT DOCUMENTS

| | | |
|---|---|---|
| 6,194,636 B1 | 2/2001 | McElroy et al. |
| 6,232,526 B1 | 5/2001 | McElroy et al. |
| 2004/0216189 A1 | 10/2004 | Houmard et al. |
| 2005/0166288 A1 | 7/2005 | Staub et al. |
| 2016/0264983 A1 | 9/2016 | Martinell et al. |
| 2020/0071712 A1 | 3/2020 | Ainley et al. |
| 2021/0054404 A1 | 2/2021 | Sakai et al. |

FOREIGN PATENT DOCUMENTS

| | | | | |
|---|---|---|---|---|
| WO | WO-2019040645 A1 | * | 2/2019 | ............ C12N 15/102 |

OTHER PUBLICATIONS

Lin, M. T., Orr, D. J., Worrall, D., Parry, M. A., Carmo-Silva, E., & Hanson, M. R. (2021). A procedure to introduce point mutations into the Rubisco large subunit gene in wild-type plants. The Plant Journal, 106(3), 876-887. (Year: 2021).*
Invitation to Pay Additional Fees regarding International App. No. PCT/US22/75022, mailed Nov. 1, 2022.
International Search Report and Written Opinion regarding International App. No. PCT/US22/75022 mailed Jan. 11, 2023.
Bock. Engineering plastid genomes: methods, tools, and applications in basic research and biotechnology. Annu Rev Plant Biol. 66:211-41, (2015).
Daniell, et al. Transient foreign gene expression in chloroplasts of cultured tobacco cells after biolistic delivery of chloroplast vectors. PNAS 87 (1), 88-92, (1990).
Daniell, et al. Chloroplast genomes: diversity, evolution, and applications in genetic engineering. Genome Biol 17, 134 (2016).
Golds, et al. Stable Plastid Transformation in PEG-treated Protoplasts of Nicotiana tabacum. Nature Biotechnology 11, 95-97, (1993).
Hanson, et al. Chloroplast transformation for engineering of photosynthesis. Journal of Experimental Botany, vol. 64, Issue 3, pp. 731-742, (2013).
Johnson, et al. MRL1, a Conserved Pentatricopeptide Repeat Protein, Is Required for Stabilization of rbcL mRNA in Chlamydomonas and *Arabidopsis*. The Plant Cell, vol. 22, Issue 1, pp. 234-248, 2010.
O'Neill, et al. Chloroplast transformation in plants: polyethylene glycol (PEG) treatment of protoplasts is an alternative to biolistic delivery systems. The Plant Journal, 3: 729-738, (1993).
Sanford, et al. Optimizing the biolistic process for different biological applications. Methods in Enzymology, vol. 217, pp. 483-509, (1993).
Sauer, et al. Oligonucleotide-Mediated Genome Editing Provides Precision and Function to Engineered Nucleases and Antibiotics in Plants. Plant Physiology, vol. 170, Issue 4, pp. 1917-1928, (2016).
Verma, et al. Chloroplast Vector Systems for Biotechnology Applications. Plant Physiology, vol. 145, Issue 4, pp. 1129-1143 (2007).
Whitney, et al. Construction of a tobacco master line to improve Rubisco engineering in chloroplasts. Journal of Experimental Botany, vol. 59, Issue 7, pp. 1909-1921, (2008).
Extended European Search Report regarding European App. No. 22859321.6, mailed May 13, 2025.

(Continued)

*Primary Examiner* — Charles Logsdon
*Assistant Examiner* — Jessica Nicole Stockdale
(74) *Attorney, Agent, or Firm* — Dentons US LLP; Jan Desomer

(57) ABSTRACT

Provided are methods for plastid genome editing and development of plants, plant cells, plant parts, and seeds comprising edited plastid genomes. Compositions for transformation of plastid genomes are further provided. Specifically, the plastid genome is modified to comprise the replacement of a targeted endogenous plastid genome sequence with a modified version of the target plastid sequence, where the modified plastid genome sequence has been designed to deliberately reduce its homology to the targeted endogenous plastid genome sequence and, in some cases, encode a protein containing one or more mutations.

22 Claims, 6 Drawing Sheets

Specification includes a Sequence Listing.

(56) References Cited

OTHER PUBLICATIONS

Heckart et al., Synonymous mutation gene design to overexpress ACCase in creeping bentgrass to obtain resistance to ACCase-inhibiting herbicides, Transgenic Research 25(4):465-476, 2016.
Lin et al, A procedure to introduce point mutations into the Rubisco large subunit gene in wild-type plants, The Plant Journal 106(3):876-887, 2021.

* cited by examiner

FIG. 1

| 1st letter | \ | Second Letter | | | | 3rd letter |
|---|---|---|---|---|---|---|
| | | U | C | A | G | |
| U | | UUU[13] Phe<br>UUC[8] Phe<br>UUA[11] Leu<br>UUG[10] Leu | UCU[5]<br>UCC[4] Ser<br>UCA[3]<br>UCG[3] | UAU[14] Tyr<br>UAC[3] Tyr<br>UAA[1] Stop<br>UAG[0] Stop | UGU[5] Cys<br>UGC[3] Cys<br>UGA[0] Stop<br>UGG[9] Trp | U<br>C<br>A<br>G |
| C | | CUU[11]<br>CUC[1] Leu<br>CUA[6]<br>CUG[3] | CCU[12]<br>CCC[2] Pro<br>CCA[5]<br>CCG[2] | CAU[9] His<br>CAC[5] His<br>CAA[3] Gln<br>CAG[3] Gln | CGU[13]<br>CGC[2] Arg<br>CGA[7]<br>CGG[0] | U<br>C<br>A<br>G |
| A | | AUU[8]<br>AUC[10] Ile<br>AUA[1]<br>AUG[10] Met | ACU[19]<br>ACC[6] Thr<br>ACA[5]<br>ACG[1] | AAU[13] Asn<br>AAC[3] Asn<br>AAA[19] Lys<br>AAG[5] Lys | AGU[4] Ser<br>AGC[4] Ser<br>AGA[7] Arg<br>AGG[0] Arg | U<br>C<br>A<br>G |
| G | | GUU[15]<br>GUC[3] Val<br>GUA[14]<br>GUG[3] | GCU[22]<br>GCC[8] Ala<br>GCA[12]<br>GCG[5] | GAU[22] Asp<br>GAC[4] Asp<br>GAA[29] Glu<br>GAG[5] Glu | GGU[21]<br>GGC[4] Gly<br>GGA[13]<br>GGG[13] | U<br>C<br>A<br>G |

FIG. 2

SEQ ID NO:15
SEQ ID NO:16

FIG. 5A
Primer pairs    3615 + 3620      2980 + 3622
Event
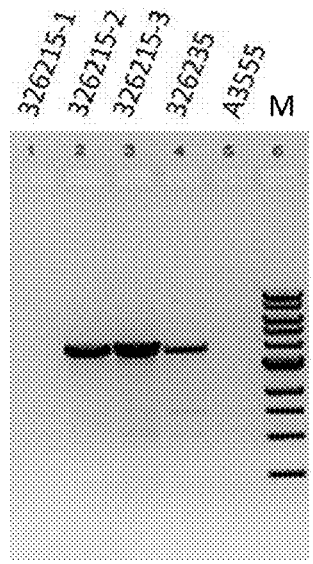
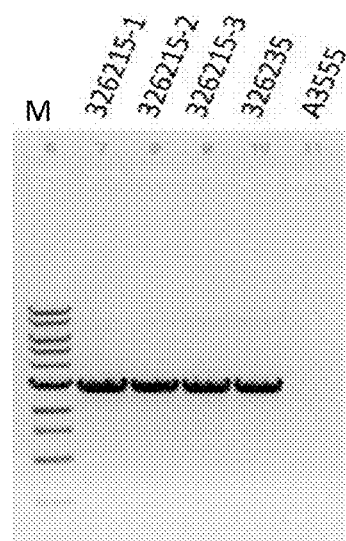
*atp* arm      *aadA* arm
Key
326215-1 = E6G-N95Q mrbcL event 1
326215-2 = E6G-N95Q mrbcL event 2
326215-3 = E6G-N95Q mrbcL event 3
326235 = E6G-989G mrbcL event 1
A3555 = Wt control
M = size marker

SEQUENCE LISTING

```
Sequence total quantity: 17
SEQ ID NO: 1              moltype = DNA   length = 1428
FEATURE                   Location/Qualifiers
source                    1..1428
                          mol_type = genomic DNA
                          organism = Glycine max
SEQUENCE: 1
atgtcaccac aaacagagac taaagcaagt gttgggttca aagctggtgt taaagattat    60
aaattgactt attatactcc tgactatgaa accaaagata ctgatatctt ggcagcattc   120
cgagtaactc ctcaaccagg agttccgcct gaagaagcag gtgccgcggt agccgccgaa   180
tcttctactg gtacatggac aactgtgtgg accgatgggc ttaccagtct tgatcgttac   240
aaagggcgat gctacggcct tgaacctgtt gctggggaag aaaatcaata tattgcttat   300
gtagcttatc ccttagacct ttttgaagaa ggttctgtta caacatgtt tacttccatt   360
gtcggtaatg tatttgggtt caaggccctg cgtgctctac gtctggagga tttgcgaatc   420
cctactgctt atattaaaac tttccaaggt ccgcctcatg gcatccaagt tgagagagat   480
aaattgaaca agtatggtcg tcccctatta ggatgtacta ttaaacctaa attggggtta   540
tccgctaaga attatggtag agctgtttat gaatgtcttc gtgggggact tgattttacc   600
aaagatgatg aaaatgtgaa ttcccaacca tttatgcgtt ggagagaccg tttcttattt   660
tgtgccgaag ccatttttaa atcacaggct gaaacaggtg aaatcaaagg cattacttg    720
aatgcaactg cgggtacatg cgaagaaatg atgaaaagag ctgtatttgc cagagaatta   780
ggcgttccta tcgtaatgca tgattattta acggggggat tcactgcaaa tactagcttg   840
gctcattatt gccgagataa tggtctactt cttcatatac accgtgcaat gcatgcagtt   900
atcgacagac aaaagaatca tggtatgcac tttcgtgtac tagctaaagc attacgtttg   960
tctggtggag atcatgttca cgccggtacc gtagtaggta aacttgaagg ggaaagagaa  1020
atcactttag gttttgttga tttactacgt gatgatttg ttgaaaaaga tcgaagtcgc  1080
ggtatttatt tcactcagga ttgggtttct ctaccaggtg ttttgcctgt agcttcggga  1140
ggtattcacg tttggcatat gcctgctctg accgagatct ttggggatga ttctgtactc  1200
caatttggcg gaggaactt aggacaccct tggggaaatg caccaggtgc tgtagctaat  1260
cgagtagctc ttgaagcatg tgtgcaggct cgaaatgaag gacgcgatct tgctcgtgaa  1320
ggtaatgaaa ttatccgtga ggctagcaaa tggagtcctg aattagctgc tgcttgtgaa  1380
gtatggaagg agatcaaatt tgaattcgaa gcaatgacta ctttgtaa              1428

SEQ ID NO: 2              moltype = AA    length = 475
FEATURE                   Location/Qualifiers
source                    1..475
                          mol_type = protein
                          organism = Glycine max
SEQUENCE: 2
MSPQTETKAS VGFKAGVKDY KLTYYTPDYE TKDTDILAAF RVTPQPGVPP EEAGAAVAAE    60
SSTGTWTTVW TDGLTSLDRY KGRCYGLEPV AGEENQYIAY VAYPLDLFEE GSVTNMFTSI   120
VGNVFGFKAL RALRLEDLRI PTAYIKTFQG PPHGIQVERD KLNKYGRPLL GCTIKPKLGL   180
SAKNYGRAVY ECLRGGLDFT KDDENVNSQP FMRWRDRFLF CAEAIFKSQA ETGEIKGHYL   240
NATAGTCEEM MKRAVFAREL GVPIVMHDYL TGGFTANTSL AHYCRDNGLL LHIHRAMHAV   300
IDRQKNHGMH FRVLAKALRL SGGDHVHAGT VVGKLEGERE ITLGFVDLLR DDFVEKDRSR   360
GIYFTQDWVS LPGVLPVASG GIHVWHMPAL TEIFGDDSVL QFGGGTLGHP WGNAPGAVAN   420
RVALEACVQA RNEGRDLARE GNEIIREASK WSPELAAACE VWKEIKFEFE AMDTL        475

SEQ ID NO: 3              moltype = DNA   length = 1428
FEATURE                   Location/Qualifiers
misc_feature              1..1428
                          note = Synthetic sequence. Codon-modified rbcL gene
source                    1..1428
                          mol_type = other DNA
                          organism = synthetic construct
SEQUENCE: 3
atgagtcctc aaactgaaac caaagcttct gtaggtttta agcaggtgt aaaggactat     60
```

```
aagttaacat attacacccc agattacgag actaaggaca ctgacattct tgctgctttt      120
agagttacac cacagcctgg tgtacctcca gaggaagctg gagctgcagt tgctgcagag      180
agttcaactg gaacttggac tactgtttgg acagacggtt tgacttcttt ggatagatat      240
aaaggtcgtt gttatggttt ggagccagta gcaggtgaag agaaccagta catcgcatac      300
gttgcatacc ctcttgattt gttcgaggaa ggaagtgtaa caaatatgtt cacatctatc      360
gttggaaacg ttttcggttt taaagctttg agagctttga gattagaaga ccttcgtatt      420
ccaacagcat acatcaagac ctttcaggga cctccacacg gtattcaggt agaacgtgat      480
aagcttaata aatatggaag accattgctt ggttgcacca tcaagccaaa gcttggtctt      540
agtgccaaaa actacggacg tgcagtatac gagtgcttaa gaggaggttt agacttcaca      600
aaggacgatg agaacgttaa cagtcagcct ttcatgagat ggcgtgatag attccttttc      660
tgcgctgagg ctatcttcaa gagtcaagca gagactggag agattaaagg acactatctt      720
aacgctacag caggaacctg tgaagagatg atgaagcgtg cagttttcgc acgtgagctt      780
ggagtaccaa ttgttatgca cgactatctt acaggaggtt ttacagctaa tacatctctt      840
gcacattatt gtagagataa tggacttcta cttcacatcc atcgagctat gcatgctgta      900
attgatcgtc agaaaaatca cggaatgcat ttccgtgttc ttgcaaaagc tcttcgtctt      960
agtgaggtga tcacgtaca tgcaggaact gttgtgggaa attagaaagg agaacgtgag     1020
attactctcg gattcgtaga tcttttgcga gatgactttg tagaaaagga tcgttccaga     1080
ggaatctatt ttacacaaga ctgggtaagc cttcctggga tacttccagt tgcatccggt     1140
ggaatccatg tatggcacat gccagcactt acagaaattt tcggagacga tagcgttctg     1200
cagttcggag gtgggactct tgggcatcca tgggggaatg ctcctggagc agtcgcaaat     1260
agagttgcat tagaggcctg cgtacaagca cgtaatgagg gacgagactt agcaagagag     1320
gggaacgaga tcatccgaga agcatctaag tggtcgccag aacttgcagc tgcatgcgag     1380
gtttggaaag aaatcaagtt cgagtttgag gctatgcaca ccctttaa                  1428

SEQ ID NO: 4           moltype = DNA  length = 2453
FEATURE                Location/Qualifiers
source                 1..2453
                       mol_type = genomic DNA
                       organism = Glycine max
SEQUENCE: 4
tcatcttttt attttttct atcttttctt actgtttcat tttccatttt ttagttattc       60
cgatattcgg acgcatcaac ttgttatgaa atcacattga tagcctctac tcgtgtccta      120
gctcgtctaa gagctagatt tgcctcaatt gtttgtctct tgccttccgc cttattcaaa      180
ttagcttctg ctatttcaag agtttgctgt gcttcttgtg gatcaatgtc actaccctt      240
tccgcatcat ttactaaaac agtgatctca ttattgttta ttctagcaaa accgccatc      300
agagccatcg ttaaccattg gtctttaaga agacgtattc tcaaaatacc tatatctacg      360
gctgtggcaa taggcgcatg atttggtaat actccaattt gtccgctatt agtagataaa      420
atgatttcct tcacttccga atcccaaaca attcgattgg gggtcagtac acaaagattt      480
aaagtcattt cttcaaattg ctctccattt ctaagttcgt agctttcgca gtagcttcat      540
cgatattacc taccaaataa aaggcttgtt caggaagacc atctaattct ccagaaagaa      600
tcaattaaa ccctctaatt gtttctgcta gactaacata tttcccggc gaaccggtaa       660
aaacttctgc tacgaaaaaa ggttgtgata agaaacgctc aatttttcgt gctcttgcta      720
cggttaagcg atcttcttcg gataattcgt ccaagccaag gatagctata atgtctttga      780
gttctttgta acgttgtaaa gtttgtttaa ctctttgcgc agtctcataa tgttcttcac      840
caacgattcg aggttggagc atagttgagg ttgaatctaa aggatctact gctggataga      900
tacctttggc cgctaatcct cttgatagta cagtagtagc atctaaatgt gcaaatgtcg      960
tagcaggcgc aggatcggtt aaatcgtctg cgggtacata aactgcttga ataggaagtta    1020
tggaccccctc tttggtagaa gtgattcttt cttgtaaaga acccatttca gtactaagag    1080
tgggttgata acccacagca gaaggcattc gacccaataa ggcagatact tcagatcctg     1140
cttggacgaa gcgaaagata ttgtcgataa atagaagtac atcttgttca ttgacatctc     1200
gaaaatattc cgccatagtc agggcagtta aaccaactct catacgagct ccgggcggtt     1260
cattcatttg accatatact agagctactt tgattctgc aatattttgt tcattaatta      1320
ctccagattc tttcatttcc atataaagat catttccctc acgagtacgt tcacctactc     1380
cgccaaatac agatacacct ccatgagctt tggcaatgtt attgatcaat tcataatca      1440
gtaccgttttt acccactcca gctccaccga aaagtcctat ttttcctcca cgacgataag    1500
gagctaaaag atctactact tttattcctg tttcaaaaat ggctaattt tgtatctaatt    1560
gtataaaggc aggcgcagat ctatgaatgg gagatgttgt gcgagtatct acaggaccta     1620
aattatcaat gggctctcca agcacgttga aaattcgtcc tagagttgct ccacctactg     1680
gaacacttag ggcagctcct gtgtcaatca cttccattcc tctcattaga ccttctgtcg     1740
cactcatagc tacagctcta attcgattat ttcctaataa ttgctgtact tcacaagtca     1800
cattaatttg ttgaccaaca gtatctcgac ccttaactat cagagcgttg taaatattag     1860
gcatcttacc tgggggaaaa gctacatcta gtaccggacc aattatttgg gcgatacgtc     1920
ccagattttt ttttcaagc gcagaaacct caggaccaga agtagtagga ttgattcgca      1980
tataaaaata gattcaaatt ttttccggaa aattttgaaa atcaaaaaga aatgttcgat     2040
aacaaagcaa gttgatcggt taattcaata ataaataaga aatgggagtt agtactccat    2100
tttttgata ccattcgacc aatccaatta aattgtttac ttattcaatt tcaataattg     2160
aattcttaag tttatcccag tcatttttaa aatttcaatt ggataaaatc tttcgaaagt    2220
tttttattttt ttctatcat tatagacaat atcatctata ttctctatgg aagtcgaacc    2280
tgaacccttat ttacaattct tttttttca atatcatcag ctttcgtatt tcatcagtag    2340
acaatttata cttagcatat tttttttacct acttttttttc ccgggagaag tctgcctatt   2400
tttacatcta ggatttacat atacaacata tatcactgtc aagattaaga gtg            2453

SEQ ID NO: 5           moltype = DNA  length = 2128
FEATURE                Location/Qualifiers
source                 1..2128
                       mol_type = genomic DNA
                       organism = Glycine max
SEQUENCE: 5
caatactaat attgacaata gtgtatcaaa taaatataat ccgatcgtga gtaaattgat       60
```

-continued caatttactc acgtgaaata ggctttatta cttcatcaaa tggtaggttc attggatttt 120
ctgcgataca accaataaat tctttttga ttaaaaggta agtaattcaa ttatatataa 180
taattatata taataatgta taacatagta gataaagagg tggtatacca ttttttttta 240
gaaatttttt tttgttttat ctgttcattt gtatgttgag aatcaattcg acttcaacat 300
tttgagtttt tctatttttt tgaatgtctg atattttatt agacaattca atcttttcat 360
tttattgttt ttattgcgat tggatatata cacccacgtt attttctaaa ttgtattggg 420
gttgctaact caatggtaga gtactcggct tttaagagcg attctatttt ttacacattt 480
ctatgaagca atcggttcgt ccataccatt ggtagagctt gtaaaaccac gactgatcca 540
taaaggaatg aatggaaaaa gtagcatgtc gtatcgatga agaattctaa aaatatttca 600
ttctcttata ggatccggcc agaatttttg tttgtgaatt cttggctcgg aacaaaaaaa 660
ttcagttggg tttaattaat aaagggatag agcttggtga ctccaattat aatagggaaa 720
caaaaagcaa cgagctttca ttttttttat ttgaatgatt accccatcta attgtacgtt 780
aaaaagatat tagtgcttga tatgggaaaa gcttttccgg tgaatggatt atttattttt 840
gttatgagtc ctaactatat agctattttc cattatattt ttgggtagcg ataaatgtgt 900
aaaagaaaga gtatattgat aaagatattt tttccaaaat caaaagagcg attaggttga 960
aaaaaaataa aggattccta actagcttgt tatcctagaa caaaaattag gtggaaaagc 1020
gattagagag agtccgttga tgatttttac ttgttttgta ggtatatata catataccta 1080
taattccctg ttttgatcat atcgcactat gtatcatttg ataatccaat gaatctctga 1140
ttctttgttt gactaaatag actttttaa ttttaaatgg aggaatctcg agcatattta 1200
gaactccata gatctcgaca ccaggacacc ctataccctc ttttttccg ggaatctatt 1260
tacggactag cttgtggtca tgggtccatt tttgtagaaa atgtcggtta taacaataaa 1320
tttagtttac taattgtaaa acgtttaatt actcgaatgt atcaacagac tcatttcatc 1380
atttttacta acgattctaa caaaaatcct tttatgggtt ataacaatca ttttattct 1440
caaataatat tagaaggttt tgttgtcgtc gtggagattc tattttccct acaattttgt 1500
atatcttcct taagggaatt cgaaatcgta aaatcttata ataatttgcg atcaattcat 1560
tccatttttc cctttttcga agataaactg atatatttaa atcatgagtc agatatacga 1620
ataccctatc ctatccacct ggaaatcttg gttcaaatcc ttcgatattg gataaaagat 1680
gtctctttct ttcatttatt aaggtttttt ttttcttatt attataattg gaatagtatt 1740
tttactccaa aaaaatggat ttctactttt ttttcaaaaa gtaatccaag atttttttg 1800
ttcctatata atttatatgt atgggaatat gaatctatct ttcttttct acgtaacaaa 1860
tcctctaagt tacgattaaa atattttcgc gttttttttg agcgaatttt tttctatgaa 1920
aaaatagaac atcttgtaga agtatctgtt aaggattgtt catataccct atcattcttt 1980
aaggatactt tcatgcatta tgttagatat caaggaaaat ccattttggt ttcaaagaat 2040
actcctcttt tgataaataa atggaaatac tattttatct atttatggca atgtcatttt 2100
gatatttggt ctcgaccagg aacgatcc 2128

SEQ ID NO: 6 moltype = DNA length = 302
FEATURE Location/Qualifiers
source 1..302
mol_type = genomic DNA
organism = Glycine max
SEQUENCE: 6
ggattattta gattagatat ttcgattcca aaattaaaaa aagggatagg agattaaaaa 60
ttgaaaaaaa aaaacaaaaa ttgggttgcg ccatacatat aaaagagtat acaataatga 120
tgtatttgac aaatcaaata ccatcgttta ataataacga accttgggga ttaattgata 180
atattagttt attatttggg aaagattcct gtgaaatgaa agatttcatt aactcctaag 240
tcatgtcgag tagaccttgt tgtttcgaga attcttaatt catgagttgt agggagggat 300
tt 302

SEQ ID NO: 7 moltype = DNA length = 300
FEATURE Location/Qualifiers
source 1..300
mol_type = genomic DNA
organism = Glycine max
SEQUENCE: 7
gcagagaatt aattgcaatt aaactcggcc caatcttttc ctaaaaggat tgagccgaat 60
acaatactac aaacaatact acaatacaaa gatacttatt atctaaagat acttattata 120
tatatatata tatatttata tatatatata tattagtttt tgttttgtat tggaatagat 180
tggaatagaa aggtggtaag cagacgagat tttacgaaaa aagttattcc aatttctaag 240
ggaagttgct ttattttttt ctatttctat attaaatata ttaaaattcc atttttatat 300

SEQ ID NO: 8 moltype = DNA length = 1428
FEATURE Location/Qualifiers
misc_feature 1..1428
note = Synthetic sequence. DNA sequence encoding mutant E6G-P89G RuBisCOlarge subunit
source 1..1428
mol_type = other DNA
organism = synthetic construct
SEQUENCE: 8
atgagtcctc aaactggaac caaagcttct gtaggtttta aagcaggtgt aaaggactat 60
aagttaacat attacacccc agattacgag actaaggaca ctgacattct tgctgctttt 120
agagttacac cacagcctgg tgtacctcca gaggaagctg gagctgcagt tgctgcagag 180
agttcaactg gaacttggac tactgtttgg acagacggtt tgacttcttt ggatagatat 240
aaaggtcgtt gttatggttt ggagggagta gcaggtgaag agaaccagta catcgcatac 300
gttgcatacc ctcttgattt gttcgaggaa ggaagtgtaa caaatatgtt cacatctatc 360
gttggaaacg ttttcggttt taaagctttg agagctttga gattagaaga ccttcgtatt 420
ccaacagcat acatcaagac ctttcaggga cctccacacg gtattcaggt agaacgtgat 480
aagcttaata aatatggaag accattgctt ggttgcacca tcaagccaaa gcttggtctt 540

```
agtgccaaaa actacggacg tgcagtatac gagtgcttaa gaggaggttt agacttcaca    600
aaggacgatg agaacgttaa cagtcagcct tcatgagat ggcgtgatag attccttttc    660
tgcgctgagg ctatcttcaa gagtcaagca gagactggag agattaaagg acactatctt    720
aacgctacag caggaacctg tgaagagatg atgaagcgtg cagttttcgc acgtgagctt    780
ggagtaccaa ttgttatgca cgactatctt acaggaggtt ttacagctaa tacatctctt    840
gcacattatt gtagagataa tggacttcta cttcacatcc atcgagctat gcatgctgta    900
attgatcgtc agaaaaatca cggaatgcat ttccgtgttc ttgcaaaagc tcttcgtctt    960
agtggaggtg atcacgtaca tgcaggaact gttgtgggaa aattagaagg agaacgtgag   1020
attactctcg gattcgtaga tcttttgcga gatgactttg tagaaaagga tcgttccaga   1080
ggaatctatt ttacacaaga ctgggtaagc cttcctggag tacttccagt tgcatccggt   1140
ggaatccatg tatggcacat gccagcactt acagaaattt tcggagacga tagcgttctg   1200
cagttcggag gtgggactct tgggcatcca tgggggaatg ctcctggagc agtcgcaaat   1260
agagttgcat tagaggcctg cgtacaagca cgtaatgagg gacgagactt agcaagagag   1320
gggaacgaga tcatccgaga agcatctaag tggtcgccag aacttgcagc tgcatgcgag   1380
gtttggaaag aaatcaagtt cgagtttgag gctatggaca ccctttaa                1428

SEQ ID NO: 9                 moltype = AA   length = 475
FEATURE                      Location/Qualifiers
REGION                       1..475
                             note = Synthetic sequence. Mutant E6G-P89G RuBisCO large
                             subunit,encoded by SEQ ID NO: 8
source                       1..475
                             mol_type = protein
                             organism = synthetic construct
SEQUENCE: 9
MSPQTGTKAS VGFKAGVKDY KLTYYTPDYE TKDTDILAAF RVTPQPGVPP EEAGAAVAAE    60
SSTGTWTTVW TDGLTSLDRY KGRCYGLEGV AGEENQYIAY VAYPLDLFEE GSVTNMFTSI   120
VGNVFGFKAL RALRLEDLRI PTAYIKTFQG PPHGIQVERD KLNKYGRPLL GCTIKPKLGL   180
SAKNYGRAVY ECLRGGLDFT KDDENVNSQP FMRWRDRFLF CAEAIFKSQA ETGEIKGHYL   240
NATAGTCEEM MKRAVFAREL GVPIVMHDYL TGGFTANTSL AHYCRDNGLL LHIHRAMHAV   300
IDRQKNHGMH FRVLAKALRL SGGDHVAGT VVGKLEGERE ITLGFVDLLR DDFVEKDRSR   360
GIYFTQDWVS LPGVLPVASG GIHVWHMPAL TEIFGDDSVL QFGGGTLGHP WGNAPGAVAN   420
RVALEACVQA RNEGRDLARE GNEIIREASK WSPELAAACE VWKEIKFEFE AMDTL        475

SEQ ID NO: 10                moltype = DNA   length = 1428
FEATURE                      Location/Qualifiers
misc_feature                 1..1428
                             note = Synthetic sequence. DNA sequence encoding the mutant
                             E6G-N95QRuBisCO large subunit.
source                       1..1428
                             mol_type = other DNA
                             organism = synthetic construct
SEQUENCE: 10
atgagtcctc aaactggaac caaagcttct gtaggtttta agcaggtgt aaaggactat    60
aagttaacat attacacccc agattacgag actaaggaca ctgacattct tgctgctttt   120
agagttacac cacagcctgg tgtacctcca gaggaagctg gagctgcagt tgctgcagag   180
agttcaactg gaacttggac tactgttttgg acagacgttt tacttcttt ggatagatat   240
aaaggtcgtt gttatggttt ggagccagta gcaggtgaag agcaacagta catcgcatac   300
gttgcatacc ctcttgattt gttcgaggaa ggaagtgtaa caaatatgtt cacatctatc   360
gttggaaacg ttttcggttt taagctttg agagctttga gattagaaga ccttcgtatt   420
ccaacagcat acatcaagac cttttcaggga cctccacacg gtattcaggt gaacgtagag   480
aagcttaata aatatggaag accattgctt ggttgcacca tcaagccaaa gcttggtctt   540
agtgccaaaa actacggacg tgcagtatac gagtgcttaa gaggaggttt agacttcaca   600
aaggacgatg agaacgttaa cagtcagcct tcatgagat ggcgtgatag attccttttc    660
tgcgctgagg ctatcttcaa gagtcaagca gagactggag agattaaagg acactatctt   720
aacgctacag caggaacctg tgaagagatg atgaagcgtg cagttttcgc acgtgagctt   780
ggagtaccaa ttgttatgca cgactatctt acaggaggtt ttacagctaa tacatctctt   840
gcacattatt gtagagataa tggacttcta cttcacatcc atcgagctat gcatgctgta   900
attgatcgtc agaaaaatca cggaatgcat ttccgtgttc ttgcaaaagc tcttcgtctt   960
agtggaggtg atcacgtaca tgcaggaact gttgtgggaa aattagaagg agaacgtgag  1020
attactctcg gattcgtaga tcttttgcga gatgactttg tagaaaagga tcgttccaga  1080
ggaatctatt ttacacaaga ctgggtaagc cttcctggag tacttccagt tgcatccggt  1140
ggaatccatg tatggcacat gccagcactt acagaaattt tcggagacga tagcgttctg  1200
cagttcggag gtgggactct tgggcatcca tgggggaatg ctcctggagc agtcgcaaat  1260
agagttgcat tagaggcctg cgtacaagca cgtaatgagg gacgagactt agcaagagag  1320
gggaacgaga tcatccgaga agcatctaag tggtcgccag aacttgcagc tgcatgcgag  1380
gtttggaaag aaatcaagtt cgagtttgag gctatggaca ccctttaa                1428

SEQ ID NO: 11                moltype = AA   length = 475
FEATURE                      Location/Qualifiers
REGION                       1..475
                             note = Synthetic sequence.Mutant E6G-N95Q RuBisCO large
                             subunit,encoded by SEQ ID NO: 10
source                       1..475
                             mol_type = protein
                             organism = synthetic construct
SEQUENCE: 11
MSPQTGTKAS VGFKAGVKDY KLTYYTPDYE TKDTDILAAF RVTPQPGVPP EEAGAAVAAE    60
SSTGTWTTVW TDGLTSLDRY KGRCYGLEPV AGEEQQYIAY VAYPLDLFEE GSVTNMFTSI   120
```

```
VGNVFGFKAL RALRLEDLRI PTAYIKTFQG PPHGIQVERD KLNKYGRPLL GCTIKPKLGL    180
SAKNYGRAVY ECLRGGLDFT KDDENVNSQP FMRWRDRFLF CAEAIFKSQA ETGEIKGHYL    240
NATAGTCEEM MKRAVFAREL GVPIVMHDYL TGGFTANTSL AHYCRDNGLL LHIHRAMHAV    300
IDRQKNHGMH FRVLAKALRL SGGDHVHAGT VVGKLEGERE ITLGFVDLLR DDFVEKDRSR    360
GIYFTQDWVS LPGVLPVASG GIHVWHMPAL TEIFGDDSVL QFGGGTLGHP WGNAPGAVAN    420
RVALEACVQA RNEGRDLARE GNEIIREASK WSPELAAACE VWKEIKFEFE AMDTL         475

SEQ ID NO: 12           moltype = DNA   length = 25
FEATURE                 Location/Qualifiers
misc_feature            1..25
                        note = Synthetic sequence. Primer 3615
source                  1..25
                        mol_type = other DNA
                        organism = synthetic construct
SEQUENCE: 12
tccctatacc cgcattatgc ctagc                                          25

SEQ ID NO: 13           moltype = DNA   length = 25
FEATURE                 Location/Qualifiers
misc_feature            1..25
                        note = Synthetic sequence. Primer 3620
source                  1..25
                        mol_type = other DNA
                        organism = synthetic construct
SEQUENCE: 13
ctttggcttg atggtgcaac caagc                                          25

SEQ ID NO: 14           moltype = DNA   length = 26
FEATURE                 Location/Qualifiers
misc_feature            1..26
                        note = Synthetic sequence. Primer 2980.
source                  1..26
                        mol_type = other DNA
                        organism = synthetic construct
SEQUENCE: 14
tcagcccgtc atacttgaag ctagac                                         26

SEQ ID NO: 15           moltype = DNA   length = 25
FEATURE                 Location/Qualifiers
misc_feature            1..25
                        note = Synthetic sequence. Primer 3622
source                  1..25
                        mol_type = other DNA
                        organism = synthetic construct
SEQUENCE: 15
gcgcagtact tttgtgctta cgagc                                          25

SEQ ID NO: 16           moltype = DNA   length = 1986
FEATURE                 Location/Qualifiers
source                  1..1986
                        mol_type = genomic DNA
                        organism = Glycine max
SEQUENCE: 16
taaaagagta tacaataatg atgtatttga caaatcaaat accatcgttt aataataacg    60
aaccttgggg attaattgat aatattagtt tattatttgg gaaagattcc tgtgaaatga    120
aagatttcat taactcctaa gtcatgtcga gtagaccttg ttgtttcgag aattcttaat    180
tcatgagttg tagggaggga tttatgtcac cacaaacaga gactaaagca agtgttgggt    240
tcaaagctgt tgttaaagat tataaattga cttattatac tcctgactat gaaaccaaag    300
atactgatat cttggcagca ttccgagtaa ctcctaacac aggagttccg cctgaagaag    360
caggtgccgc ggtagccgcc gaatcttcta ctggtacatg gacaactgtg tggaccgatg    420
ggcttaccag tcttgatcgt tacaaagggc gatgctacgg ccttgaacct gttgctgggg    480
aagaaaatca atatattgct tatgtagctt atcccttaga cctttttgaa gaaggttctg    540
ttactaacat gtttacttcc attgtcggta atgtatttgg gttcaaggcc ctgcgtgctc    600
tacgtctgga ggatttgcga atccctactg cttatattaa aactttccaa ggtccgcctc    660
atggcatcca agttgagaga gataaattga acaagtatgg tcgtccccta ttaggatgta    720
ctattaaacc taaattgggg ttatccgcta agaattatgg tagagctgtt tatgaatgtc    780
ttcgtggggg acttgatttt accaaagatg atgaaaatgt gaattcccaa ccatttatgc    840
gttggagaga ccgtttctta ttttgtgccg aagccattt taaatcacag gctgaaacag    900
gtgaaatcaa agggcattac ttgaatgcaa ctgcgggtac atgcgaagaa atgatgaaaa    960
gagctgtatt tgccagagaa ttaggcgttc ctatcgtaat gcatgattat ttaacggggg    1020
gattcactgc aaatactagc ttggctcatt attgccgaga taatggtcta cttcttcata    1080
tacaccgtgc aatgcatgca gttatcgaca gacaaaagaa tcatggtatg cactttcgtg    1140
tactagctaa agcattacgt ttgtctggtg gagatcatgt tcacgccggt accgtagtag    1200
gtaaacttga agggggaaga gaaatcactt taggtttttgt tgatttacta cgtgatgatt    1260
ttgttgaaaa agatcgaagt cgcggtattt atttcactca ggattgggtt tctctaccag    1320
gtgttttgcc tgtagcttcg ggaggttatt cacgtttggca tatgcctgct ctgaccgaga    1380
tctttgggga tgattctgta ctccaatttg gcggaggaac tttaggacac ccttgggaa     1440
atgcaccagg tgctgtagct aatcgagtag ctcttgaagc atgtgtgcag gctcgaaatg    1500
aaggacgcga tcttgctcgt gaaggtaatg aaaattatccg tgaggctagc aaatggagtc    1560
```

```
ctgaattagc tgctgcttgt gaagtatgga aggagatcaa atttgaattc gaagcaatgg  1620
atactttgta agcagagaat taattgcaat taaactcggc ccaatctttt cctaaaagga  1680
ttgagccgaa tacaatacta caaacaatac tacaatacaa agatacttat tatctaaaga  1740
tacttattat atatatatat atatatttat atatatatat atattagttt ttgtttttgta 1800
ttggaataga ttggaataga aaggtggtaa gcagacgaga ttttacgaaa aaagttattc  1860
caatttctaa gggaagttgc tttattttt tctatttcta tattaaatat attaaaattc    1920
cattttata tttatttata gatttcgatt atagatttcg ataatttata gatttcgatc     1980
attttt                                                               1986

SEQ ID NO: 17         moltype = DNA  length = 1986
FEATURE               Location/Qualifiers
misc_feature          1..1986
                      note = Synthetic sequence
source                1..1986
                      mol_type = other DNA
                      organism = synthetic construct
SEQUENCE: 17
taaaagagta tacaataatg atgtatttga caaatcaaat accatcgttt aataataacg  60
aaccttgggg attaattgat aatattagtt tattatttgg gaaagattcc tgtgaaatga  120
aagatttcat taactcctaa gtcatgtcga gtagaccttg ttgtttcgag aattcttaat  180
tcatgagttg tagggaggga tttatgagtc ctcaaactga aaccaaagct tctgtaggtt  240
ttaaagcagg tgtaaaggac tataagttaa catattacac cccagattac gagactaagg  300
acactgacat tcttgctgct tttagagtta caccacagcc tggtgtacct ccagaggaag  360
ctggagctgc agttgctgca gagagttcaa ctggaacttg gactactgtt tggacagacg  420
gtttgacttc tttggataga tataaaggtc gttgttatgg tttggagcca gtagcaggtg  480
aagagaacca gtacatcgca tacgttgcat accctcttga tttgttcgag gaaggaagtg  540
taacaaatat gttcacatct atcgttgaa acgttttcgg ttttaaagct ttgagagctt   600
tgagattaga agaccttcgt attccaacag catacatcaa gaccttcag ggacctccac    660
acggtattca ggtagaacgt gataagctta ataaatatgg aagaccattg cttggttgca  720
ccatcaagcc aaagcttggt cttagtgcca aaaactacgg acgtgcagta tacgagtgct  780
taagaggagg tttagacttc acaaaggacg atgagaacgt taacagtcag cctttcatga  840
gatggcgtga tagattcctt ttctgcgctg aggctatctt caagagtcaa gcagagactg  900
gagagattaa aggacactat cttaacgcta cagcaggaac ctgtgaagag atgatgaagc  960
gtgcagtttt cgcacgtgag cttggagtac caattgttat gcacgactat cttacaggag 1020
gttttacagc taatacatct cttgcacatt attgtagaga taatggactt ctacttcaca  1080
tccatcgagc tatgcatgct gtaattgatc gtcagaaaaa tcacggaatg catttccgtg  1140
ttcttgcaaa agctcttcgt cttagtggag gtgatcacgt acatgcagga actgttgtgg  1200
gaaaattaga aggagaacgt gagattactc tcggattcgt agatcttttg cgagatgact  1260
ttgtagaaaa ggatcgttcc agaggaatct attttacaca agactgggta agccttcctg  1320
gagtacttcc agttgcatcc ggtggaatcc atgtatggca catgccagca cttacagaaa  1380
ttttcggaga cgatagcgtt ctgcagttcg gaggtgggac tcttgggcat ccatggggga  1440
atgctcctgg agcagtcgca aatagagttg cattagaggc ctgcgtacaa gcacgtaatg  1500
agggacagga cttagcaaga gagggaacg agatcatccg agaagcatct aagtggtcgc   1560
cagaacttgc agctgcatgc gaggtttgga aagaaatcaa gttcgagttt gaggctatgg  1620
acacccttta agcagagaat taattgcaat taaactcggc ccaatctttt cctaaaagga  1680
ttgagccgaa tacaatacta caaacaatac tacaatacaa agatacttat tatctaaaga  1740
tacttattat atatatatat atatatttat atatatatat atattagttt ttgtttttgta 1800
ttggaataga ttggaataga aaggtggtaa gcagacgaga ttttacgaaa aaagttattc  1860
caatttctaa gggaagttgc tttattttt tctatttcta tattaaatat attaaaattc    1920
cattttata tttatttata gatttcgatt atagatttcg ataatttata gatttcgatc     1980
attttt                                                               1986
```

METHODS FOR MODIFYING PLASTID GENOMES

CROSS-REFERENCE TO RELATED APPLICATIONS

This application claims the priority of U.S. Provisional Appl. Ser. No. 63/233,921, filed Aug. 17, 2021, which is incorporated herein by reference in its entirety.

FIELD OF THE INVENTION

The present disclosure relates to the field of agricultural biotechnology, and more specifically to methods and compositions for genome editing in plastids.

INCORPORATION OF SEQUENCE LISTING

A sequence listing contained in the file named "MONS498US.xml" which is 36,864 bytes (measured in MS-Windows®) and created on Aug. 5, 2022, is filed electronically herewith and incorporated by reference in its entirety.

BACKGROUND

Gene editing has become an important tool in crop development, and methods have been developed for editing plant nuclear genomes using site-specific nucleases. However, efforts to edit genes located on plant plastid genomes have not met with significant success. Plastid genome editing typically relies on homologous recombination to direct insertion of a transgene of interest between two predetermined plastid genome sequences. It has not previously been possible to efficiently introduce point mutations into plastid genome sequences due to the extremely active plastid DNA repair system in combination with the high plastid copy number and the extensive recombination which occurs between sequences of high homology. Because of this, there is a need in the art to develop a method that allows the efficient introduction of point mutations to plastid genome sequences.

SUMMARY

The present disclosure provides a method of modifying a plastid genome comprising: a. introducing a recombinant nucleic acid molecule into a plant cell, wherein the recombinant nucleic acid molecule comprises, from 5' to 3': i. a first homology sequence that is homologous to a first endogenous plastid genome sequence; ii. a modified sequence that comprises at least one silent mutation relative to a target plastid sequence; and iii. a second homology sequence that is homologous to a second endogenous plastid genome sequence, wherein the target plastid sequence is located in a plastid genome of the plant cell between the first endogenous plastid genome sequence and the second endogenous plastid genome sequence; and b. allowing homologous recombination to occur such that the modified sequence replaces the target plastid sequence in the plastid genome of the plant cell. In some embodiments, the modified sequence comprises at least a second, third, fourth, fifth, sixth, seven, eight, ninth, tenth, eleventh, twelfth, thirteenth, fourteenth, fifteenth, sixteenth, seventeenth, eighteenth, nineteenth, or twentieth silent mutation relative to the target plastid sequence. In other embodiments, the modified sequence comprises at least one functional mutation relative to the target plastid sequence. In certain embodiments, the modified sequence comprises at least a second, third, fourth, fifth, sixth, seven, eight, ninth, tenth, eleventh, twelfth, thirteenth, fourteenth, fifteenth, sixteenth, seventeenth, eighteenth, nineteenth, or twentieth functional mutation relative to the target plastid sequence. In particular embodiments, the modified sequence is at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% identical to the target plastid sequence. In other embodiments, the modified sequence is less than 30%, less than 35%, less than 40%, less than 45%, less than 50%, less than 55%, less than 60%, less than 65%, less than 70%, less than 75% less than 80%, less than 85% identical, less than 90%, or less than 95% to the target plastid sequence.

In some embodiments, the first homology sequence is essentially identical to the first endogenous plastid genome sequence. In other embodiments, the second homology sequence is essentially identical to the second endogenous plastid genome sequence. In additional embodiments, the target plastid sequence comprises at least a portion of a plastid gene, or a sequence complementary to at least a portion of a plastid gene. In some embodiments, the recombinant nucleic acid molecule further comprises a selectable marker gene between the first homology sequence and the second homology sequence. In certain embodiments, the selectable marker gene is selected from the group consisting of nptII, aph IV, aadA, aac3, aacC4, bar, pat, DMO, EPSPS, and aroA. In other embodiments, the recombinant nucleic acid molecule further comprises a terminator sequence between the first homology sequence and the second homology sequence. In yet other embodiments, the recombinant nucleic acid molecule further comprises a promoter sequence between the first homology sequence and the second homology sequence.

In some embodiments, the plant cell of the method is a monocotyledonous plant cell. In certain embodiments, the monocotyledonous plant cell is a corn cell, a rice cell, a wheat cell, a barley cell, or a sugarcane cell. In other embodiments, the plant cell of the method is a dicotyledonous plant cell. In particular embodiments, the dicotyledonous plant cell is a soybean cell, an alfalfa cell, a cotton cell, a tomato cell, an *Arabidopsis* cell, or a canola cell.

In additional embodiments, the method further comprises the step of: c. selecting a transformed plant cell comprising the modified sequence. In further embodiments, the selecting step comprises selecting the transformed plant cell based on a molecular technique. In yet further embodiments, the selecting step comprises selecting the transformed plant cell based on a phenotypic change caused by the modified sequence in the plastid genome of the transformed plant cell. In yet further embodiments, the selecting step comprises selecting the transformed plant cell based on the presence of the modified sequence in the plastid genome of the transformed plant cell. In certain embodiments, the method further comprises: c. regenerating a transformed plant from the transformed plant cell.

The present disclosure also provides a vector for replacing a target plastid sequence in a plant cell, wherein said plasmid vector comprises a recombinant nucleic acid molecule comprising, in order from 5' to 3': i. a first homology sequence, wherein the first homology sequence is homologous to a first endogenous plastid genome sequence; ii. a modified sequence, wherein the modified sequence comprises at least one silent mutation relative to the target plastid sequence;

and iii. a second homology sequence, wherein the second homology sequence is homologous to a second endogenous plastid genome sequence; wherein the target plastid sequence is located in a plastid genome of the plant cell between the first endogenous plastid genome sequence and the second endogenous plastid genome sequence.

The present disclosure provides a method of modifying a plastid genome comprising: a. introducing a recombinant nucleic acid molecule into a plant cell, wherein the recombinant nucleic acid molecule comprises, from 5' to 3': i. a first homology sequence that is homologous to a first endogenous plastid genome sequence; ii. a modified sequence that comprises at least one silent mutation every 1,000 nucleotides relative to a target plastid sequence; and iii. a second homology sequence that is homologous to a second endogenous plastid genome sequence, wherein the target plastid sequence is located in a plastid genome of the plant cell between the first endogenous plastid genome sequence and the second endogenous plastid genome sequence; and, b. allowing homologous recombination to occur such that the modified sequence replaces the target plastid sequence in the plastid genome of the plant cell. In some embodiments, the modified sequence comprises at least one silent mutation every 500 nucleotides relative to the target plastid sequence. In other embodiments, the modified sequence comprises at least one silent mutation every 250 nucleotides relative to the target plastid sequence.

The present disclosure also provides a vector for replacing a target plastid sequence in a plant cell, wherein said plasmid vector comprises a recombinant nucleic acid molecule comprising, in order from 5' to 3': i. a first homology sequence, wherein the first homology sequence is homologous to a first endogenous plastid genome sequence; ii. a modified sequence, wherein the modified sequence comprises at least one silent mutation every 1,000 nucleotides relative to the target plastid sequence; and iii. a second homology sequence, wherein the second homology sequence is homologous to a second endogenous plastid genome sequence; wherein the target plastid sequence is located in a plastid genome of the plant cell between the first endogenous plastid genome sequence and the second endogenous plastid genome sequence. In certain embodiments, the modified sequence comprises at least one silent mutation every 500 nucleotides relative to the target plastid sequence. In other embodiments, the modified sequence comprises at least one silent mutation every 250 nucleotides relative to the target plastid sequence. In other embodiments, the modified sequence comprises at least one silent mutation every 3, 6, 9, 12, 15, 18, 21, 24, 27, 30, 33, 36, 39, 42, 45, 48, 51, 54, 57, 60, 63, 66, 69, 72, 75, 78, 81, 84, 87, 90, 93, 96, 99, 102, 105, 108, 111, 114, 117, 120, 123, 126, 129, 132, 135, 138, 141, 144, 147, 150, 153, 156, 159, 162, 165, 168, 171, 174, 177, 180, 183, 186, 189, 192, 195, 198, 201, 204, 207, 210, 213, 216, 219, 222, 225, 228, 231, 234, 237, 240, 243, 246, or 249 nucleotides relative to the target plastid sequence. Transgenic plant cells produced by the methods described herein and comprising a modified sequence within a plastid genome are also provided.

BRIEF DESCRIPTION OF THE DRAWINGS

FIG. 1 shows an RNA codon table, which demonstrates which amino acids are encoded by various RNA triplets. The superscript numbers next to the codons indicate the frequency with which each codon occurs in the native soybean rbcL coding sequence (SEQ ID NO:1).

FIG. 2 shows a sequence alignment of the wild type soybean rbcL gene (top) and codon-modified soybean rbcL gene sequence (bottom). The homologous arms flanking the modified rbcL sequence exhibit high homology, while the modified rbcL sequence exhibits low homology due to codon modification.

FIG. 5 shows PCR results for detection of gene replacement events. FIG. 5A depicts the identification of gene replacement events for E6G-N95Q and E6G-P89G rbcL.

BRIEF DESCRIPTION OF THE SEQUENCES

Figure 3:
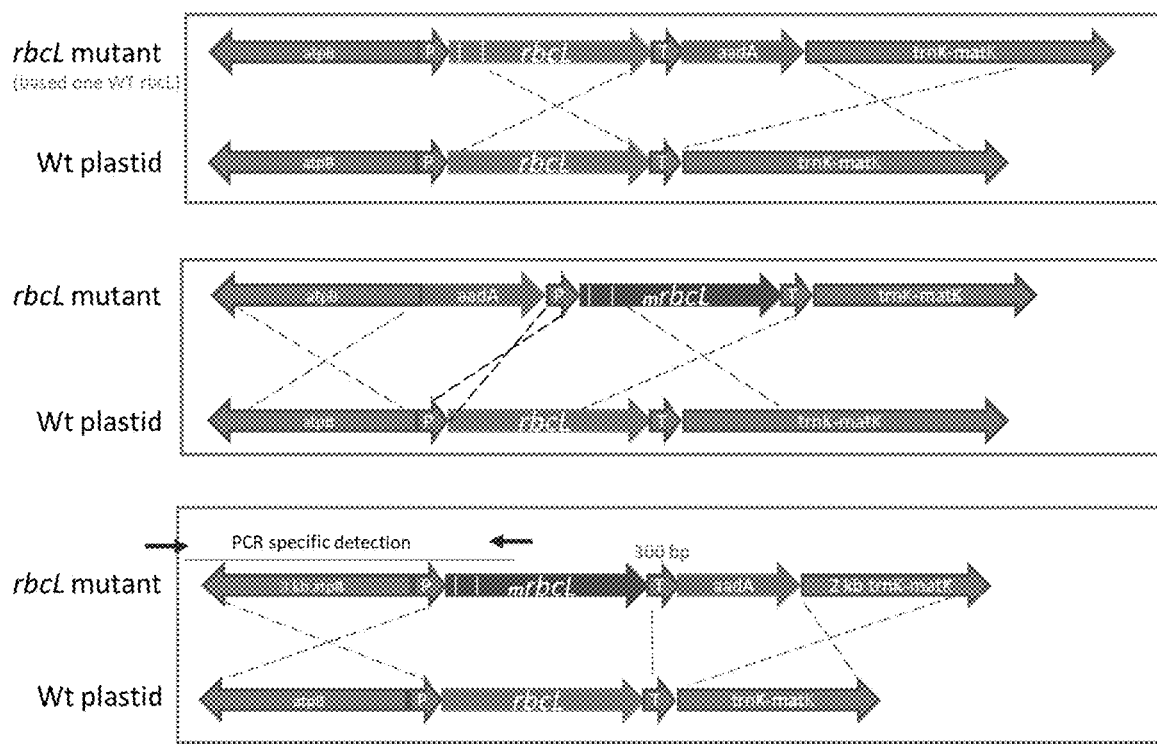
FIG. 3 depicts the design of a recombinant DNA construct used to replace the native soybean rbcL gene via homologous recombination. Potential regions for homologous recombination between the plastid genome and the DNA construct are denoted by solid "X" lines between the construct and the wild type (WT) plastid sequence. "aptB" represents the continuous sequence of the aptB gene which is located upstream of the native rbcL sequence. "P" represents the native rbcL promoter sequence and "T" represents the native rbcL terminator sequence. "Trnk-matK" represents the continuous sequence of the region downstream of the native rbcL sequence and encodes Trnk-matK.

SEQ ID NO:1 is the DNA sequence of the wild type soybean rbcL gene encoding the RuBisCO large subunit.

SEQ ID NO:2 is the amino acid sequence of the soybean RuBisCO large subunit, encoded by SEQ ID NO:1.

SEQ ID NO:3 is the DNA sequence of a codon-modified rbcL gene.

SEQ ID NO:4 is the DNA sequence of a 5' homology sequence corresponding to the region upstream of the rbcL gene in the soybean plastid genome.

SEQ ID NO:5 is the DNA sequence of a 3' homology sequence corresponding to the region downstream of the rbcL gene in the soybean plastid genome.

SEQ ID NO:6 is the DNA sequence for the native soybean rbcL gene promoter sequence.

SEQ ID NO:7 is the DNA sequence for the native soybean rbcL gene terminator sequence.

SEQ ID NO:8 is a DNA sequence encoding the mutant E6G-P89G RuBisCO large subunit.

SEQ ID NO:9 is the amino acid sequence of the mutant E6G-P89G RuBisCO large subunit, encoded by SEQ ID NO:8.

SEQ ID NO:10 is a DNA sequence encoding the mutant E6G-N95Q RuBisCO large subunit.

SEQ ID NO:11 is the amino acid sequence of the mutant E6G-N95Q RuBisCO large subunit, encoded by SEQ ID NO:10.

SEQ ID NO:12 through SEQ ID NO:15 are PCR primer sequences for detection of transformation events.

SEQ ID NO:16 is the DNA sequence of the wild type soybean rbcL gene flanked by the 5' and 3' homology sequences.

SEQ ID NO:17 is the DNA sequence of the codon-modified soybean rbcL gene sequence flanked by the 5' and 3' homology sequences.

DETAILED DESCRIPTION

In recent years, gene editing has become an important tool in crop development. Gene editing enables precise, targeted changes to a plant genome, ranging from single nucleotide alterations to the insertion of whole exogenous genes at specific genomic locations. Non-homologous end joining (NHEJ) DNA repair or DNA oligo/template-mediated exchange have been used effectively for nuclear genome editing.

However, a number of genes involved in respiration, photosynthesis, and development in plants are found on a plastid genome rather than the nuclear genome. Researchers have spent years attempting to introduce specific point mutations into genes located on plant plastid genomes without significant success. This may be due to homologous recombination involving native plastid sequences within plasmid vectors used to introduce modified sequences. The chloroplast genome has a naturally high level of recombinogenic activity, and the plastid DNA repair system, which utilizes homology-directed repair, is thought to be fastidious in correcting mutations found in its genome. This is due to the presence of numerous copies of plastids within a single plant cell and the extensive recombination that occurs between sequences of high homology. Indeed, even if a selectable marker is utilized to maintain a targeted point mutation in the plastid genome, there is a probability that recombination will separate the point mutation from an introduced selectable marker gene, thereby making the selection of successful transformants difficult. For all of these reasons, the introduction of point mutations into genes located on plastid genomes has proved difficult and time consuming.

In order to address these limitations, the present disclosure provides improved methods of editing plastid genomes. In certain embodiments, approaches for reliably producing one or more targeted point mutations in a desired gene in the plastid genome are provided. For example, the present disclosure provides methods for replacing an endogenous target plastid sequence in the plastid genome with a modified sequence that has been designed to reduce its homology to the endogenous target plastid sequence. The modified sequence may comprise one or more silent mutations, such that the modified nucleic acid sequence has low sequence identity with the target plastid sequence while still encoding the same or a similar amino acid sequence. The reduced homology of the modified sequence with the corresponding endogenous sequence reduces the likelihood that the modified sequence will be repaired by the plastid DNA repair system, thus increasing editing efficiency.

In some embodiments, the modified sequence may comprise one or more nonsynonymous codon substitutions (functional mutations) in addition to comprising one or more synonymous codon substitutions (silent mutations) and will therefore encode a protein that has one or more amino acid substitutions compared to the amino acid sequence encoded by the endogenous target sequence. In some embodiments, to facilitate delivery of the modified sequence via chloroplast transformation, the modified sequence is comprised in a recombinant DNA molecule. The recombinant DNA molecule may comprise at least a first homology sequence and a second homology sequence flanking the modified sequence to allow for homologous recombination at a particular target site or locus within a plastid or plastomic DNA molecule or genome of a target cell. While the modified sequence may have relatively low homology to the endogenous target plastid sequence, each of the homology arms will have high homology to the corresponding plastid genome sequences. In some embodiments, the homology arms may be perfectly homologous or 100% identical to the corresponding plastid genome sequence. In some embodiments, the homology arms may be substantially homologous or 95%, 95.5%, 96%, 96.5%, 97%, 97.5%, 98%, 98.5%, 99%, 99.1%, 99.2%, 99.3%, 99.4%, 99.5%, 99.6%, 99.7%, 99.8%, 99.9% or more identical to the corresponding plastid genome sequence. This configuration improves plastid transformation efficiency and avoids introduction of additional mutations while increasing the likelihood that the endogenous target sequence is replaced with the modified sequence. In certain embodiments, the recombinant DNA molecule also comprises a selectable marker gene to facilitate the selection of transformants. The marker gene may also be located between the left and right homology sequences. Homologous recombination between the recombinant DNA molecule and the plastid genome through the two flanking regions can introduce the marker gene into the plastid genome while fully replacing the endogenous target sequence with the modified sequence. The disclosed methods represent a significant advantage over the art because they allow efficient replacement of any endogenous plastid sequence. In some embodiments, the endogenous target sequence is a coding sequence. In some embodiments, the endogenous target sequence is a non-coding sequence. In some embodiments, the endogenous target sequence is an enhancer sequence, an intron sequence, an exon sequence, a terminator sequence, a promoter sequence, and/or an enhancer sequence.

I. Genome Editing in Plants

Genome editing techniques have become an important tool in the development of improved crop species. Genome editing enables precise modifications to specific targets in the genome and typically utilizes the cell's own DNA repair mechanisms to make the desired modifications. In plant cells, the endogenous DNA repair systems work through homologous recombination and non-homologous end-joining (NHEJ) to repair DNA. Homologous recombination involves the exchange of nucleotides at a conserved region shared by two nucleic acid molecules whereas NHEJ simply joins two nucleic acids together. Targeted modifications introduced through NHEJ are typically premature stop codons and/or frame-shift mutations.

Homologous recombination can be used to modify the genome to contain an insertion or a replacement of a gene through use of a donor sequence. Examples of methods for introducing donor polynucleotides into a plant genome or modifying genomic DNA of a plant include the use of sequence-specific nucleases, such as zinc-finger nucleases, engineered or native meganucleases, TALE-endonucleases, or RNA-guided endonucleases (for example, a Type I Clustered Regularly Interspersed Short Palindromic Repeat (CRISPR)-Cas system, a Type II CRISPR-Cas system (e.g., a Cas9 system), a Type III CRISPR-Cas system, a Type IV CRISPR-Cas system, a Type V CRISPR-Cas system (e.g., a Cas12a (Cpf1) system, a Cas12b system, a Cas12c (C2c3) system, a Cas12d (CasY) system, a Cas12e (CasX) system, a Cas12g system, a Cas12h system, a Cas12i system, a C2c1 system, a C2c4 system, a C2c5 system, a C2c8 system, a C2c9 system, a C2c10 system, a Cas14a system, a Cas14b system, a Cas14c system, etc.), a Type VI CRISPR-Cas system). Some embodiments relate to methods of genome editing using single-stranded oligonucleotides to introduce precise base pair modifications in a plant genome, as described by Sauer et al. (*Plant Physiol.* 170(4):1917-1928, 2016) however methods of using genome editing to modify, delete, or insert nucleic acid sequences into genomic DNA are well-known in the art. While genome editing has the potential to be a valuable tool in plant breeding programs, its uses in crop development have been limited by the time and expense required to produce and identify plants comprising desired genome modifications. Furthermore, a large number of genes that are important to plant development and photosynthetic processes (and thus desirable targets for modification) are encoded by the plastid genome. Therefore, a need exists for methods of plastid genome modifications. Specifically, there are not efficient methods for introducing specific point mutations to a targeted site in the plastid genome or for replacing an endogenous plastid sequence (such as a gene) with a modified version of the same sequence. In order to address this, the present disclosure provides novel methods for efficient targeted sequence replacement in plastid genomes in a single step which can be used to create one or more point mutations in the coding sequence or the amino acid encoded by the targeted sequence.

As used herein, an "endogenous" or a "native" gene refers to a gene that originates from within a given organism, cell, tissue, genome, or chromosome and was not previously modified by human action. Similarly, an "endogenous protein" refers to a protein encoded by an endogenous gene.

As used herein, "replacing" an endogenous plastid sequence comprises exchanging in the plastid genome a specific endogenous plastid sequence with a modified version of the sequence.

As used herein, "modified," in the context of plants, seeds, plant components, plant cells, and plant genomes, refers to a state containing changes or variations from their natural or native state. For instance, a "native transcript" of a gene refers to an RNA transcript that is generated from an unmodified gene. Typically, a native transcript is a sense transcript. Modified plants or seeds contain molecular changes in their genetic materials, including either genetic or epigenetic modifications. Typically, modified plants or seeds, or a parental or progenitor line thereof, have been subjected to mutagenesis, genome editing (e.g., without being limiting, via methods using homologous recombination), genetic transformation (e.g., without being limiting, via methods of chloroplast transformation or microprojectile bombardment), or a combination thereof.

As used herein, a "modified sequence" comprises a polynucleotide sequence that replaces a target plastid sequence in the plastid genome. In an aspect, the modified sequence comprises one or more synonymous codon substitutions relative to the endogenous target sequence. In another aspect, the synonymous codon is selected based on the frequency the codon appears in the endogenous sequence. A "modified sequence" may refer to a sequence having one or more silent mutations, functional mutations, substitutions, deletions, or insertions compared with an endogenous sequence. In certain examples, a "modified sequence" refers to a sequence having one or more silent mutations compared with an endogenous plastid genomic sequence. A "modified sequence" may have one or more functional mutations compared with an endogenous plastid genomic sequence. A "modified sequence" may also have one or more silent mutations and one or more functional mutations compared with an endogenous plastid genomic sequence.

In one aspect, a modification to a nucleic acid molecule encoding a protein results in a modified sequence having at least 1, at least 2, at least 3, at least 4, at least 5, at least 6, at least 7, at least 8, at least 9, at least 10, at least 15, at least 20, at least 25, at least 30, at least 40, at least 50, at least 75, or at least 100 mutations as compared to an endogenous protein. In another aspect, a modification to a nucleic acid molecule comprises the substitution of at least 1, at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides as compared to the unmodified nucleic acid molecule. In another aspect, a modification to a nucleic acid molecule comprises the substitution of a nucleotide at least every 3, at least every 6, at least every 9, at least every 12, at least every 15, at least every 18, at least every 21, at least every 24, at least every 27, at least every 30, at least every 33, at least every 36, at least every 39, at least every 42, at least every 45, at least every 48, at least every 51, at least every 54, at least every 57, at least every 60, at least every 63, at least every 66, at least every 69, at least every 72, at least every 75, at least every 78, at least every 81, at least every 84, at least every 87, at least every 90, at least every 93, at least every 96, at least every 99, at least every 102, at least every 105, at least every 108, at least every 111, at least every 114, at least every 117, at least every 120, at least every 123, at least every 126, at least every 129, at least every 132, at least every 135, at least every 138, at least every 141, at least every 144, at least every 147, at least every 150, at least every 153, at least every 156, at least every 159, at least every 162, at least every 165, at least every 168, at least every 171, at least every 174, at least every 177, at least every 180, at least every 183, at least every 186, at least every 189, at least every 192, at least every 195, at least every 198, at least every 201, at least every 204, at least every 207, at least every 210, at least every 213, at least every 216, at least every 219, at least every 222, at least every 225, at least every 228, at least every 231, at least every 234, at least every 237, at least every 240, at least every 243, at least every 246, or at least every 249 nucleotides as compared to the unmodified nucleic acid molecule. In some embodiments, a "modification" comprises the substitution of an "A" for a "C", "G" or "T" in a nucleic acid sequence. In some embodiments, a "modification" comprises the substitution of a "C" for an "A", "G" or "T" in a nucleic acid sequence. In some embodiments, a "modification" comprises the substitution of a "G" for an "A", "C" or "T" in a nucleic acid sequence. In some embodiments, a "modification" comprises the substitution of a "T" for an "A", "C" or "G" in a nucleic acid sequence. In some embodiments, a "modification" comprises the substitution of a "C" for a "U" in a nucleic acid sequence. In some embodiments, a "modification" comprises the substitution of a "G" for an "A" in a nucleic acid sequence. In some embodiments, a "modification" comprises the substitution of an "A" for a "G" in a nucleic acid sequence. In some embodiments, a "modification" comprises the substitution of a "T" for a "C" in a nucleic acid sequence. In some embodiments, a "modification" comprises deletion of one or more nucleotides in a nucleic acid sequence. In some embodiments, a "modification" comprises insertion of one or more nucleotides in a nucleic acid sequence. In some embodiments, a "modification" comprises duplication of one or more nucleotides in a nucleic acid sequence.

As used herein, a "synonymous" modification refers to a single nucleotide change that results in a codon that codes for the same amino acid. As used herein, a "nonsynonymous" modification refers to a single nucleotide change that results in a codon that codes for a different amino acid. For example, the codon "CGU" encodes an arginine amino acid. If a synonymous modification changes the U to an A, producing a "CGA" codon, the codon still encodes an arginine amino acid. If a nonsynonymous modification changes the G to a U, producing a "CUU" codon, the codon now encodes a leucine amino acid. In an aspect, a modified sequence as described herein comprises one or more synonymous modifications compared to the endogenous target sequence in the plastid genome.

Several embodiments relate to plant cells, plant tissue, plant seed, and plants produced by the methods disclosed herein. Plants may be monocots or dicots, and may include, for example, rice, wheat, barley, oats, rye, sorghum, maize, grapes, tomatoes, peppers, potatoes, lettuce, broccoli, cucumber, peanut, melon, leeks, onion, soybean, alfalfa, sunflower, cotton, canola, and sugar beet plants As used herein, "plant" refers to a whole plant. A cell or tissue culture derived from a plant can comprise any plant parts or plant organs (e.g., leaves, stems, roots, etc.), plant tissues, seeds, plant cells, and/or progeny of the same. A progeny plant can be from any filial generation, e.g., $F_1$, $F_2$, $F_3$, $F_4$, $F_5$, $F_6$, $F_7$, etc. A plant cell is a biological cell of a plant, taken from a plant or derived through culture from a cell taken from a plant.

In one aspect, a plant part provided herein includes, but is not limited to, a leaf, a stem, a root, a seed, a flower, pollen, an anther, an ovule, a pedicel, a fruit, a meristem, a cotyledon, a hypocotyl, a pod, an embryo, endosperm, an explant, a callus, a tissue culture, a shoot, a cell, and a protoplast. In further aspects, this disclosure provides plant cells, tissues, and organs that are not reproductive material and do not mediate the natural reproduction of the plant. In another aspect, this disclosure also provides plant cells, tissues, and organs that are reproductive material and mediate the natural reproduction of the plant. In another aspect, this disclosure provides plant cells, tissues, and organs that cannot maintain themselves via photosynthesis. In another aspect, this disclosure provides somatic plant cells. Somatic cells, contrary to germline cells, do not mediate plant reproduction.

Provided cells, tissues and organs can be from seed, fruit, leaf, cotyledon, hypocotyl, meristem, embryos, endosperm, root, shoot, stem, pod, flower, inflorescence, stalk, pedicel, style, stigma, receptacle, petal, sepal, pollen, anther, filament, ovary, ovule, pericarp, phloem, and vascular tissue. In another aspect, this disclosure provides a plant chloroplast. In another aspect, this disclosure provides a plant chromoplast. In another aspect, this disclosure provides a plant proplastid. In another aspect, this disclosure provides a plant etioplast. In another aspect, this disclosure provides a plant leucoplast. In another aspect, this disclosure provides a plant amyloplast. In another aspect, this disclosure provides a plant elaioplast. In another aspect, this disclosure provides a plant proteinoplast. In a further aspect, this disclosure provides an epidermal cell, a stomata cell, a trichome cell, a root hair, or a storage root. In another aspect, this disclosure provides a protoplast.

In an aspect, a plant cell provided herein is a corn cell. In another aspect, a plant cell provided herein is a rice cell. In a further aspect, a plant cell provided herein is a wheat cell. In another aspect, a plant cell provided herein is a barley cell. In yet another aspect, a plant cell provided herein is a sugarcane cell. In an aspect, a plant cell provided herein is selected from the group consisting of a corn cell, a rice cell, a wheat cell, a barley cell, and a sugarcane cell.

In an aspect, a plant cell provided herein is a soybean cell. In another aspect, a plant cell provided herein is an alfalfa cell. In still another aspect, a plant cell provided herein is a cotton cell. In an aspect, a plant cell provided herein is a tomato cell. In another aspect, a plant cell provided herein is an *Arabidopsis* cell. In another aspect, a plant cell provided herein is a canola cell. In an aspect, a plant cell provided herein is selected from the group consisting of a soybean cell, an alfalfa cell, a cotton cell, a tomato cell, an *Arabidopsis* cell, and a canola cell.

In an aspect, a plant cell provided herein is an angiosperm plant cell. In another aspect, a plant cell provided herein is a gymnosperm plant cell. In another aspect, a plant cell provided herein is a dicotyledonous plant cell. In yet another aspect, a plant cell provided herein is a monocotyledonous plant cell.

In one aspect, this disclosure provides a modified corn cell. In another aspect, this disclosure provides a modified rice cell. In a further aspect, this disclosure provides a modified wheat cell. In another aspect, this disclosure provides a modified barley cell. In yet another aspect, this disclosure provides a modified sugarcane cell. In an aspect, this disclosure provides a modified soybean cell. In another aspect, this disclosure provides a modified alfalfa cell. In still another aspect, this disclosure provides a modified cotton cell. In an aspect, this disclosure provides a modified tomato cell. In another aspect, this disclosure provides a modified *Arabidopsis* cell. In another aspect, this disclosure provides a modified canola cell. In an aspect, this disclosure provides a modified angiosperm plant cell. In another aspect, this disclosure provides a modified gymnosperm plant cell. In another aspect, this disclosure provides a modified dicotyledonous plant cell. In yet another aspect, this disclosure provides a modified monocotyledonous plant cell.

In one aspect, this disclosure provides a modified corn plant. In another aspect, this disclosure provides a modified rice plant. In a further aspect, this disclosure provides a modified wheat plant. In another aspect, this disclosure provides a modified barley plant. In yet another aspect, this disclosure provides a modified sugarcane plant. In an aspect, this disclosure provides a modified soybean plant. In another aspect, this disclosure provides a modified alfalfa plant. In still another aspect, this disclosure provides a modified cotton plant. In an aspect, this disclosure provides a modified tomato plant. In another aspect, this disclosure provides a modified *Arabidopsis* plant. In another aspect, this disclosure provides a modified canola plant. In an aspect, this disclosure provides a modified angiosperm plant. In another aspect, this disclosure provides a modified gymnosperm plant. In another aspect, this disclosure provides a modified dicotyledonous plant. In yet another aspect, this disclosure provides a modified monocotyledonous plant.

In one aspect, this disclosure provides a transformed corn cell. In another aspect, this disclosure provides a transformed rice cell. In a further aspect, this disclosure provides a transformed wheat cell. In another aspect, this disclosure provides a transformed barley cell. In yet another aspect, this disclosure provides a transformed sugarcane cell. In an aspect, this disclosure provides a transformed soybean cell. In another aspect, this disclosure provides a transformed alfalfa cell. In still another aspect, this disclosure provides a transformed cotton cell. In an aspect, this disclosure provides a transformed tomato cell. In another aspect, this disclosure provides a transformed *Arabidopsis* cell. In another aspect, this disclosure provides a transformed canola cell. In an aspect, this disclosure provides a transformed angiosperm plant cell. In another aspect, this disclosure provides a transformed gymnosperm plant cell. In another aspect, this disclosure provides a transformed dicotyledonous plant cell. In yet another aspect, this disclosure provides a transformed monocotyledonous plant cell.

In one aspect, this disclosure provides a transformed corn plant. In another aspect, this disclosure provides a transformed rice plant. In a further aspect, this disclosure provides a transformed wheat plant. In another aspect, this disclosure provides a transformed barley plant. In yet another aspect, this disclosure provides a transformed sugarcane plant. In an aspect, this disclosure provides a transformed soybean plant. In another aspect, this disclosure provides a transformed alfalfa plant. In still another aspect, this disclosure provides a transformed cotton plant. In an aspect, this disclosure provides a transformed tomato plant. In another aspect, this disclosure provides a transformed *Arabidopsis* plant. In another aspect, this disclosure provides a transformed canola plant. In an aspect, this disclosure provides a transformed angiosperm plant. In another aspect, this disclosure provides a transformed gymnosperm plant. In another aspect, this disclosure provides a transformed dicotyledonous plant. In yet another aspect, this disclosure provides a transformed monocotyledonous plant.

II. Constructs for Plastid Genome Editing

Genome editing of plastid genomes utilizes plastid transformation methods and vectors specific to these methods. Vectors and constructs for plastid transformation according to methods provided may comprise one or more modified sequences, genetic elements and/or transgenes to be introduced into a plant cell or tissue, which may include a selectable marker gene and/or a gene of agronomic interest. These modified sequences, genetic element(s) and/or transgene(s) may be incorporated into a recombinant, double-stranded plasmid or vector DNA molecule that may generally comprise at least the following components: (a) at least one modified sequence; and (b) two homology arms (derived from, and corresponding to, plastid genome sequences flanking the endogenous target sequence of the plant species to be transformed) flanking the modified sequence. The vector may further comprise (i) at least one promoter or regulatory element that functions in plant cells, and more particularly in plant plastids, to cause or drive expression of a transcribable nucleic acid sequence (such as the modified sequence, the selectable marker, etc.) operably linked to the promoter, and (ii) a transcribable DNA sequence encoding a selectable marker (i.e. a selectable marker gene). Each expression cassette may further comprise 5' and a 3' untranslated region sequences, intron sequences, additional regulatory or expression elements, etc., for gene expression from a plant cell plastid transformation event.

As used herein, the term "recombinant" in reference to a DNA molecule, construct, vector, etc., refers to a DNA molecule or sequence that is not found in nature and/or is present in a context in which it is not found in nature, including a DNA molecule, construct, etc., comprising a combination of DNA sequences that would not naturally occur contiguously or in close proximity together without human intervention, and/or a DNA molecule, construct, etc., comprising at least two DNA sequences that are heterologous with respect to each other. A recombinant DNA molecule, construct, etc., may comprise DNA sequence(s) that is/are separated from other polynucleotide sequence(s) that exist in proximity to such DNA sequence(s) in nature, and/or a DNA sequence that is adjacent to (or contiguous with) other polynucleotide sequence(s) that are not naturally in proximity with each other. A recombinant DNA molecule, construct, etc., may also refer to a DNA molecule or sequence that has been genetically engineered and constructed outside of a cell. For example, a recombinant DNA molecule may comprise any suitable plasmid, vector, etc., and may include a linear or circular DNA molecule. Such plasmids, vectors, etc., may contain various maintenance elements including a prokaryotic origin of replication and selectable marker, as well as a transgene or expression cassette perhaps in addition to a plant selectable marker gene, etc.

In one aspect, methods are provided for replacing a target plastid sequence of a plant cell comprising: introducing a recombinant nucleic acid molecule into the plant cell, wherein the recombinant nucleic acid molecule comprises, in order from 5' to 3': a first homology sequence, wherein the first homology sequence is homologous to a first endogenous plastid genome sequence; a modified sequence, wherein the modified sequence comprises at least one silent mutation relative to the target plastid sequence; and a second homology sequence, wherein the second homology sequence is homologous to a second endogenous plastid genome sequence; wherein the target plastid sequence is located in a plastid genome of the plant cell between the first endogenous plastid genome sequence and the second endogenous plastid genome sequence; and cultivating the plant cell such that the modified sequence replaces the target plastid sequence in the plastid genome of the plant cell via homologous recombination. In an aspect, a recombinant nucleic acid molecule is provided comprising, in order from 5' to 3': a first homology sequence, wherein the first homology sequence is homologous to a first endogenous plastid genome sequence, a modified sequence, wherein the modified sequence comprises at least one silent mutation relative to the target plastid sequence, and a second homology sequence, wherein the second homology sequence is homologous to a second endogenous plastid genome sequence, wherein the target plastid sequence is located in a plastid genome of the plant cell between the first endogenous plastid genome sequence and the second endogenous plastid genome sequence.

As used herein, an "endogenous target sequence" or "target plastid sequence" refers to a nucleic acid sequence that is identical to a sequence in the plastid genome. In an aspect, a method provided herein replaces a target plastid sequence with a modified sequence. The target plastid sequence can be a wild type plastid genome sequence or a transgenic plastid genome sequence that was previously modified. In an aspect, a target plastid sequence comprises a protein-encoding sequence. In another aspect, a target plastid sequence comprises an RNA-encoding sequence. In a further aspect, a target plastid sequence encodes a non-protein coding sequence. In an aspect, a target plastid sequence comprises a transcribed sequence. In a further aspect, a target plastid sequence comprises a non-transcribed sequence. In an aspect, a target plastid sequence comprises at least a portion of a plastid gene intron sequence, or a complementary sequence thereof. In an aspect, a target plastid sequence comprises at least one functional mutation in an intron sequence that changes the splicing or expression of a plastid gene. In yet a further aspect, a target plastid sequence comprises at least a portion of a promoter or regulatory sequence of a plastid gene, or a complementary sequence thereof. In yet a further aspect, a target plastid sequence comprises at least a portion of a promoter, or a complementary sequence thereof. In another aspect, a target plastid sequence comprises at least one functional mutation that changes the expression of a plastid gene. In an aspect, a target plastid sequence comprises at least a portion of a plastid gene exon sequence, or a complementary sequence thereof. In an aspect, a target plastid sequence comprises at least one functional mutation in an exon sequence that changes the splicing or expression of a plastid gene. In an aspect, a target plastid sequence is present in the plastid genome as a single copy.

In one aspect, a target plastid sequence comprises at least 25 nucleotides in length. In another aspect, a target plastid sequence comprises at least 30 nucleotides in length. In another aspect, a target plastid sequence comprises at least 35 nucleotides in length. In another aspect, a target plastid sequence comprises at least 40 nucleotides in length. In another aspect, a target plastid sequence comprises at least 45 nucleotides in length. In another aspect, a target plastid sequence comprises at least 50 nucleotides in length. In another aspect, a target plastid sequence comprises at least 60 nucleotides in length. In another aspect, a target plastid sequence comprises at least 70 nucleotides in length. In another aspect, a target plastid sequence comprises at least 80 nucleotides in length. In another aspect, a target plastid sequence comprises at least 90 nucleotides in length. In another aspect, a target plastid sequence comprises at least 100 nucleotides in length. In another aspect, a target plastid sequence comprises at least 125 nucleotides in length. In another aspect, a target plastid sequence comprises at least 150 nucleotides in length. In another aspect, a target plastid sequence comprises at least 200 nucleotides in length. In another aspect, a target plastid sequence comprises at least 250 nucleotides in length. In another aspect, a target plastid sequence comprises at least 300 nucleotides in length. In another aspect, a target plastid sequence comprises at least 350 nucleotides in length. In another aspect, a target plastid sequence comprises at least 400 nucleotides in length. In another aspect, a target plastid sequence comprises at least 450 nucleotides in length. In another aspect, a target plastid sequence comprises at least 500 nucleotides in length. In another aspect, a target plastid sequence comprises at least 750 nucleotides in length. In another aspect, a target plastid sequence comprises at least 1000 nucleotides in length. In another aspect, a target plastid sequence comprises at least 1500 nucleotides in length. In another aspect, a target plastid sequence comprises at least 2000 nucleotides in length. In another aspect, a target plastid sequence comprises at least 3000 nucleotides in length. In another aspect, a target plastid sequence comprises at least 4000 nucleotides in length. In another aspect, a target plastid sequence comprises at least 5000 nucleotides in length. In an aspect, a target plastid sequence provided herein comprises at least 25, at least 30, at least 35, at least 40, at least 45, at least 50, at least 60, at least 70, at least 80, at least 90, at least 100, at least 125, at least 150, at least 200, at least 250, at least 300, at least 350, at least 400, at least 450, at least 500, at least 750, at least 1000, at least 1500, at least 2000, at least 3000, at least 4000, or at least 5000 nucleotides in length.

In an aspect, a percent identity between a modified sequence and the endogenous target plastid sequence is at least 30%. In an aspect, a percent identity between a modified sequence and the endogenous target sequence is at least 40%. In an aspect, a percent identity between a modified sequence and the endogenous target sequence is at least 50%. In an aspect, a percent identity between a modified sequence and the endogenous target sequence is at least 60%. In an aspect, a percent identity between a modified sequence and the endogenous target sequence is at least 70%. In an aspect, a percent identity between a modified sequence and the endogenous target sequence is at least 75%. In an aspect, a percent identity between a modified sequence and the endogenous target sequence is at least 80%. In an aspect, a percent identity between a modified sequence and the endogenous target sequence is at least 85%. In an aspect, a percent identity between a modified sequence and the endogenous target sequence is at least 90%. In an aspect, a percent identity between a modified sequence and the endogenous target sequence is at least 95%. In an aspect, a percent identity between a modified sequence and the endogenous target sequence is at least 96%. In an aspect, a percent identity between a modified sequence and the endogenous target sequence is at least 97%. In an aspect, a percent identity between a modified sequence and the endogenous target sequence is at least 98%. In an aspect, a percent identity between a modified sequence and the endogenous target sequence is at least 99%.

In another aspect, a modified sequence comprises at least 10 nucleotides in length. In another aspect, a modified sequence comprises at least 15 nucleotides in length. In another aspect, a modified sequence comprises at least 20 nucleotides in length. In one aspect, a modified sequence comprises at least 25 nucleotides in length. In another aspect, a modified sequence comprises at least 30 nucleotides in length. In another aspect, a modified sequence comprises at least 35 nucleotides in length. In another aspect, a modified sequence comprises at least 40 nucleotides in length. In another aspect, a modified sequence comprises at least 45 nucleotides in length. In another aspect, a modified sequence comprises at least 50 nucleotides in length. In another aspect, a modified sequence comprises at least 60 nucleotides in length. In another aspect, a modified sequence comprises at least 70 nucleotides in length. In another aspect, a modified sequence comprises at least 80 nucleotides in length. In another aspect, a modified sequence comprises at least 90 nucleotides in length. In another aspect, a modified sequence comprises at least 100 nucleotides in length. In another aspect, a modified sequence comprises at least 125 nucleotides in length. In another aspect, a modified sequence comprises at least 150 nucleotides in length. In another aspect, a modified sequence comprises at least 200 nucleotides in length. In another aspect, a modified sequence comprises at least 250 nucleotides in length. In another aspect, a modified sequence comprises at least 300 nucleotides in length. In another aspect, a modified sequence comprises at least 350 nucleotides in length. In another aspect, a modified sequence comprises at least 400 nucleotides in length. In another aspect, a modified sequence comprises at least 450 nucleotides in length. In another aspect, a modified sequence comprises at least 500 nucleotides in length. In another aspect, a modified sequence comprises at least 750 nucleotides in length. In another aspect, a modified sequence comprises at least 1000 nucleotides in length. In another aspect, a modified sequence comprises at least 1500 nucleotides in length. In another aspect, a modified sequence comprises at least 2000 nucleotides in length. In another aspect, a modified sequence comprises at least 3000 nucleotides in length. In another aspect, a modified sequence comprises at least 4000 nucleotides in length. In another aspect, a modified sequence comprises at least 5000 nucleotides in length. In an aspect, a modified sequence provided herein comprises at least 10, at least 15, at least 20, at least 25, at least 30, at least 35, at least 40, at least 45, at least 50, at least 60, at least 70, at least 80, at least 90, at least 100, at least 125, at least 150, at least 200, at least 250, at least 300, at least 350, at least 400, at least 450, at least 500, at least 750, at least 1000, at least 1500, at least 2000, at least 3000, at least 4000, or at least 5000 nucleotides in length.

As used herein, a "silent mutation" refers to a mutation to a polynucleotide that does not change the phenotype of the cell or organism in which it occurs. A silent mutation can occur in a non-coding region of a genome or in a coding region of a genome. If a silent mutation occurs in a coding region of a genome, it can occur in an intron or in an exon. It is known in the art that most amino acids can be encoded by multiple codons due to the degeneracy of the genetic code. As used herein, a "codon" refers to three DNA or RNA nucleotides (a "triplet") that encodes a specific amino acid. A silent mutation in DNA that encodes messenger RNA (mRNA) can change the mRNA sequence, but not the amino acid encoded by the altered codon. A silent mutation that occur in an exon and does not change the amino acid encoded is considered to be "synonymous mutation". Alternatively, a silent mutation in an mRNA can change an encoded amino acid if the new amino acid does not change the functionality of the encoded protein or if the properties of the endogenous amino acid are conserved. In an aspect, a modified sequence provided herein comprises one or more silent mutations relative to a target endogenous sequence. In another aspect, a modified sequence provided herein comprises one or more silent mutations relative to a target endogenous sequence that do not change the encoded protein sequence of a plastid gene.

In one aspect, a modified sequence provided herein comprises one or more silent mutations relative to a targeted endogenous sequence. In another aspect, a modified sequence provided herein comprises one or more silent mutations relative to a targeted endogenous sequence that do not change the expression or encoded protein sequence of a plastid gene. In one aspect, a modified sequence provided herein comprises two or more silent mutations relative to a targeted endogenous sequence. In another aspect, a modified sequence provided herein comprises two or more silent mutations relative to a targeted endogenous sequence that do not change the expression or encoded protein sequence of a plastid gene. In one aspect, a modified sequence provided herein comprises three or more silent mutations relative to a targeted endogenous sequence. In another aspect, a modified sequence provided herein comprises three or more silent mutations relative to a targeted endogenous sequence that do not change the expression or encoded protein sequence of a plastid gene. In one aspect, a modified sequence provided herein comprises four or more silent mutations relative to a targeted endogenous sequence. In another aspect, a modified sequence provided herein comprises four or more silent mutations relative to a targeted endogenous sequence that do not change the expression or encoded protein sequence of a plastid gene. In one aspect, a modified sequence provided herein comprises five or more silent mutations relative to a targeted endogenous sequence. In another aspect, a modified sequence provided herein comprises five or more silent mutations relative to a targeted endogenous sequence that do not change the expression or encoded protein sequence of a plastid gene. In one aspect, a modified sequence provided herein comprises six or more silent mutations relative to a targeted endogenous sequence. In another aspect, a modified sequence provided herein comprises six or more silent mutations relative to a targeted endogenous sequence that do not change the expression or encoded protein sequence of a plastid gene. In one aspect, a modified sequence provided herein comprises seven or more silent mutations relative to a targeted endogenous sequence. In another aspect, a modified sequence provided herein comprises seven or more silent mutations relative to a targeted endogenous sequence that do not change the expression or encoded protein sequence of a plastid gene. In one aspect, a modified sequence provided herein comprises eight or more silent mutations relative to a targeted endogenous sequence. In another aspect, a modified sequence provided herein comprises eight or more silent mutations relative to a targeted endogenous sequence that do not change the expression or encoded protein sequence of a plastid gene. In one aspect, a modified sequence provided herein comprises nine or more silent mutations relative to a targeted endogenous sequence. In another aspect, a modified sequence provided herein comprises nine or more silent mutations relative to a targeted endogenous sequence that do not change the expression or encoded protein sequence of a plastid gene. In one aspect, a modified sequence provided herein comprises 10 or more silent mutations relative to a targeted endogenous sequence. In another aspect, a modified sequence provided herein comprises 10 or more silent mutations relative to a targeted endogenous sequence that do not change the expression or encoded protein sequence of a plastid gene. In one aspect, a modified sequence provided herein comprises 15 or more silent mutations relative to a targeted endogenous sequence. In another aspect, a modified sequence provided herein comprises 15 or more silent mutations relative to a targeted endogenous sequence that do not change the expression or encoded protein sequence of a plastid gene. In one aspect, a modified sequence provided herein comprises 20 or more silent mutations relative to a targeted endogenous sequence. In another aspect, a modified sequence provided herein comprises 20 or more silent mutations relative to a targeted endogenous sequence that do not change the expression or encoded protein sequence of a plastid gene. In one aspect, a modified sequence provided herein comprises 25 or more silent mutations relative to a targeted endogenous sequence. In another aspect, a modified sequence provided herein comprises 25 or more silent mutations relative to a targeted endogenous sequence that do not change the expression or encoded protein sequence of a plastid gene. In one aspect, a modified sequence provided herein comprises 30 or more silent mutations relative to a targeted endogenous sequence. In another aspect, a modified sequence provided herein comprises 30 or more silent mutations relative to a targeted endogenous sequence that do not change the expression or encoded protein sequence of a plastid gene. In one aspect, a modified sequence provided herein comprises 35 or more silent mutations relative to a targeted endogenous sequence. In another aspect, a modified sequence provided herein comprises 35 or more silent mutations relative to a targeted endogenous sequence that do not change the expression or encoded protein sequence of a plastid gene. In one aspect, a modified sequence provided herein comprises 40 or more silent mutations relative to a targeted endogenous sequence. In another aspect, a modified sequence provided herein comprises 40 or more silent mutations relative to a targeted endogenous sequence that do not change the expression or encoded protein sequence of a plastid gene. In one aspect, a modified sequence provided herein comprises 50 or more silent mutations relative to a targeted endogenous sequence. In another aspect, a modified sequence provided herein comprises 50 or more silent mutations relative to a targeted endogenous sequence that do not change the expression or encoded protein sequence of a plastid gene. In one aspect, a modified sequence provided herein comprises 60 or more silent mutations relative to a targeted endogenous sequence. In another aspect, a modified sequence provided herein comprises 60 or more silent mutations relative to a targeted endogenous sequence that do not change the expression or encoded protein sequence of a plastid gene. In one aspect, a modified sequence provided herein comprises 70 or more silent mutations relative to a targeted endogenous sequence. In another aspect, a modified sequence provided herein comprises 70 or more silent mutations relative to a targeted endogenous sequence that do not change the expression or encoded protein sequence of a plastid gene. In one aspect, a modified sequence provided herein comprises 80 or more silent mutations relative to a targeted endogenous sequence. In another aspect, a modified sequence provided herein comprises 80 or more silent mutations relative to a targeted endogenous sequence that do not change the expression or encoded protein sequence of a plastid gene. In one aspect, a modified sequence provided herein comprises 90 or more silent mutations relative to a targeted endogenous sequence. In another aspect, a modified sequence provided herein comprises 90 or more silent mutations relative to a targeted endogenous sequence that do not change the expression or encoded protein sequence of a plastid gene. In one aspect, a modified sequence provided herein comprises 100 or more silent mutations relative to a targeted endogenous sequence. In another aspect, a modified sequence provided herein comprises 100 or more silent mutations relative to a targeted endogenous sequence that do not change the expression or encoded protein sequence of a plastid gene. In one aspect, a modified sequence provided herein comprises 150 or more silent mutations relative to a targeted endogenous sequence. In another aspect, a modified sequence provided herein comprises 150 or more silent mutations relative to a targeted endogenous sequence that do not change the expression or encoded protein sequence of a plastid gene. In one aspect, a modified sequence provided herein comprises 200 or more silent mutations relative to a targeted endogenous sequence. In another aspect, a modified sequence provided herein comprises 200 or more silent mutations relative to a targeted endogenous sequence that do not change the expression or encoded protein sequence of a plastid gene. In one aspect, a modified sequence provided herein comprises 250 or more silent mutations relative to a targeted endogenous sequence. In another aspect, a modified sequence provided herein comprises 250 or more silent mutations relative to a targeted endogenous sequence that do not change the expression or encoded protein sequence of a plastid gene. In one aspect, a modified sequence provided herein comprises 300 or more silent mutations relative to a targeted endogenous sequence. In another aspect, a modified sequence provided herein comprises 300 or more silent mutations relative to a targeted endogenous sequence that do not change the expression or encoded protein sequence of a plastid gene. In one aspect, a modified sequence provided herein comprises 350 or more silent mutations relative to a targeted endogenous sequence. In another aspect, a modified sequence provided herein comprises 350 or more silent mutations relative to a targeted endogenous sequence that do not change the expression or encoded protein sequence of a plastid gene. In one aspect, a modified sequence provided herein comprises 400 or more silent mutations relative to a targeted endogenous sequence. In another aspect, a modified sequence provided herein comprises 400 or more silent mutations relative to a targeted endogenous sequence that do not change the expression or encoded protein sequence of a plastid gene. In one aspect, a modified sequence provided herein comprises 450 or more silent mutations relative to a targeted endogenous sequence. In another aspect, a modified sequence provided herein comprises 450 or more silent mutations relative to a targeted endogenous sequence that do not change the expression or encoded protein sequence of a plastid gene. In one aspect, a modified sequence provided herein comprises 500 or more silent mutations relative to a targeted endogenous sequence. In another aspect, a modified sequence provided herein comprises 500 or more silent mutations relative to a targeted endogenous sequence that do not change the expression or encoded protein sequence of a plastid gene.

In one aspect, a modified sequence provided herein comprises at least 5, at least 10, at least 15, at least 20, at least 25, at least 30, at least 35, at least 40, at least 45, at least 50, at least 60, at least 70, at least 80, at least 90, at least 100, at least 150, at least 200, at least 250, at least 300, at least 350, at least 400, at least 450, or at least 500 silent mutations relative to the targeted endogenous sequence that do not change the expression or encoded protein sequence of the plastid gene.

In an aspect, a modified sequence provided herein comprises an average of at least one silent mutation every 1000 nucleotides. In an aspect, a modified sequence provided herein comprises an average of at least one silent mutation every 900 nucleotides. In an aspect, a modified sequence provided herein comprises an average of at least one silent mutation every 800 nucleotides. In an aspect, a modified sequence provided herein comprises an average of at least one silent mutation every 700 nucleotides. In an aspect, a modified sequence provided herein comprises an average of at least one silent mutation every 600 nucleotides. In an aspect, a modified sequence provided herein comprises an average of at least one silent mutation every 500 nucleotides. In an aspect, a modified sequence provided herein comprises an average of at least one silent mutation every 400 nucleotides. In an aspect, a modified sequence provided herein comprises an average of at least one silent mutation every 300 nucleotides. In an aspect, a modified sequence provided herein comprises an average of at least one silent mutation every 250 nucleotides. In an aspect, a modified sequence provided herein comprises an average of at least one silent mutation every 200 nucleotides. In an aspect, a modified sequence provided herein comprises an average of at least one silent mutation every 175 nucleotides. In an aspect, a modified sequence provided herein comprises an average of at least one silent mutation every 150 nucleotides. In an aspect, a modified sequence provided herein comprises an average of at least one silent mutation every 125 nucleotides. In an aspect, a modified sequence provided herein comprises an average of at least one silent mutation every 100 nucleotides. In an aspect, a modified sequence provided herein comprises an average of at least one silent mutation every 99 nucleotides. In an aspect, a modified sequence provided herein comprises an average of at least one silent mutation every 96 nucleotides. In an aspect, a modified sequence provided herein comprises an average of at least one silent mutation every 93 nucleotides. In an aspect, a modified sequence provided herein comprises an average of at least one silent mutation every 90 nucleotides. In an aspect, a modified sequence provided herein comprises an average of at least one silent mutation every 87 nucleotides. In an aspect, a modified sequence provided herein comprises an average of at least one silent mutation every 84 nucleotides. In an aspect, a modified sequence provided herein comprises an average of at least one silent mutation every 81 nucleotides. In an aspect, a modified sequence provided herein comprises an average of at least one silent mutation every 80 nucleotides. In an aspect, a modified sequence provided herein comprises an average of at least one silent mutation every 78 nucleotides. In an aspect, a modified sequence provided herein comprises an average of at least one silent mutation every 75 nucleotides. In an aspect, a modified sequence provided herein comprises an average of at least one silent mutation every 72 nucleotides. In an aspect, a modified sequence provided herein comprises an average of at least one silent mutation every 70 nucleotides. In an aspect, a modified sequence provided herein comprises an average of at least one silent mutation every 69 nucleotides. In an aspect, a modified sequence provided herein comprises an average of at least one silent mutation every 66 nucleotides. In an aspect, a modified sequence provided herein comprises an average of at least one silent mutation every 63 nucleotides. In an aspect, a modified sequence provided herein comprises an average of at least one silent mutation every 60 nucleotides. In an aspect, a modified sequence provided herein comprises an average of at least one silent mutation every 57 nucleotides. In an aspect, a modified sequence provided herein comprises an average of at least one silent mutation every 54 nucleotides. In an aspect, a modified sequence provided herein comprises an average of at least one silent mutation every 51 nucleotides. In an aspect, a modified sequence provided herein comprises an average of at least one silent mutation every 50 nucleotides. In an aspect, a modified sequence provided herein comprises an average of at least one silent mutation every 48 nucleotides. In an aspect, a modified sequence provided herein comprises an average of at least one silent mutation every 45 nucleotides. In an aspect, a modified sequence provided herein comprises an average of at least one silent mutation every 42 nucleotides. In an aspect, a modified sequence provided herein comprises an average of at least one silent mutation every 40 nucleotides. In an aspect, a modified sequence provided herein comprises an average of at least one silent mutation every 39 nucleotides. In an aspect, a modified sequence provided herein comprises an average of at least one silent mutation every 39 nucleotides. In an aspect, a modified sequence provided herein comprises an average of at least one silent mutation every 33 nucleotides. In an aspect, a modified sequence provided herein comprises an average of at least one silent mutation every 30 nucleotides. In an aspect, a modified sequence provided herein comprises an average of at least one silent mutation every 27 nucleotides. In an aspect, a modified sequence provided herein comprises an average of at least one silent mutation every 24 nucleotides. In an aspect, a modified sequence provided herein comprises an average of at least one silent mutation every 21 nucleotides. In an aspect, a modified sequence provided herein comprises an average of at least one silent mutation every 20 nucleotides. In an aspect, a modified sequence provided herein comprises an average of at least one silent mutation every 18 nucleotides. In an aspect, a modified sequence provided herein comprises an average of at least one silent mutation every 15 nucleotides. In an aspect, a modified sequence provided herein comprises an average of at least one silent mutation every 12 nucleotides. In an aspect, a modified sequence provided herein comprises an average of at least one silent mutation every 10 nucleotides. In an aspect, a modified sequence provided herein comprises an average of at least one silent mutation every 9 nucleotides. In an aspect, a modified sequence provided herein comprises an average of at least one silent mutation every 6 nucleotides. In an aspect, a modified sequence provided herein comprises an average of at least one silent mutation every 5 nucleotides. In an aspect, a modified sequence provided herein comprises an average of at least one silent mutation every 3 nucleotides.

As used herein, a "functional mutation" refers to a mutation that that changes the amino acid sequence or expression of the target peptide. Functional mutations are also known as "nonsynonymous mutations". In another aspect, a modified sequence provided herein comprises at least one functional mutation relative to a targeted endogenous sequence. In one aspect, a modified sequence provided herein comprises at least two functional mutations relative to a targeted endogenous sequence. In one aspect, a modified sequence provided herein comprises at least three functional mutations relative to a targeted endogenous sequence. In one aspect, a modified sequence provided herein comprises at least four functional mutations relative to a targeted endogenous sequence. In one aspect, a modified sequence provided herein comprises at least five functional mutations relative to a targeted endogenous sequence. In one aspect, a modified sequence provided herein comprises at least six functional mutations relative to a targeted endogenous sequence. In one aspect, a modified sequence provided herein comprises at least seven functional mutations relative to a targeted endogenous sequence. In one aspect, a modified sequence provided herein comprises at least eight functional mutations relative to a targeted endogenous sequence. In one aspect, a modified sequence provided herein comprises at least nine functional mutations relative to a targeted endogenous sequence. In one aspect, a modified sequence provided herein comprises at least ten functional mutations relative to a targeted endogenous sequence. In one aspect, a modified sequence provided herein comprises at least eleven functional mutations relative to a targeted endogenous sequence. In one aspect, a modified sequence provided herein comprises at least twelve functional mutations relative to a targeted endogenous sequence. In one aspect, a modified sequence provided herein comprises at least thirteen functional mutations relative to a targeted endogenous sequence. In one aspect, a modified sequence provided herein comprises at least fourteen functional mutations relative to a targeted endogenous sequence. In one aspect, a modified sequence provided herein comprises at least fifteen functional mutations relative to a targeted endogenous sequence. In one aspect, a modified sequence provided herein comprises at least sixteen functional mutations relative to a targeted endogenous sequence. In one aspect, a modified sequence provided herein comprises at least seventeen functional mutations relative to a targeted endogenous sequence. In one aspect, a modified sequence provided herein comprises at least eighteen functional mutations relative to a targeted endogenous sequence. In one aspect, a modified sequence provided herein comprises at least nineteen functional mutations relative to a targeted endogenous sequence. In one aspect, a modified sequence provided herein comprises at least twenty functional mutations relative to a targeted endogenous sequence. In one aspect, a modified sequence provided herein comprises at least twenty-five functional mutations relative to a targeted endogenous sequence. In one aspect, a modified sequence provided herein comprises at least thirty functional mutations relative to a targeted endogenous sequence. In one aspect, a modified sequence provided herein comprises at least forty functional mutations relative to a targeted endogenous sequence. In one aspect, a modified sequence provided herein comprises at least fifty functional mutations relative to a targeted endogenous sequence.

In a further aspect, a modified sequence comprises at least one functional mutation relative to a targeted endogenous sequence that encodes at least one amino acid change in the protein encoded by a plastid gene. In one aspect, a modified sequence provided herein comprises at least two functional mutations relative to a targeted endogenous sequence that encodes at least two amino acid changes in the protein encoded by a plastid gene. In one aspect, a modified sequence provided herein comprises at least three functional mutations relative to a targeted endogenous sequence that encodes at least three amino acid changes in the protein encoded by a plastid gene. In one aspect, a modified sequence provided herein comprises at least four functional mutations relative to a targeted endogenous sequence that encodes at least four amino acid changes in the protein encoded by a plastid gene. In one aspect, a modified sequence provided herein comprises at least five functional mutations relative to a targeted endogenous sequence that encodes at least five amino acid changes in the protein encoded by a plastid gene. In one aspect, a modified sequence provided herein comprises at least six functional mutations relative to a targeted endogenous sequence that encodes at least six amino acid changes in the protein encoded by a plastid gene. In one aspect, a modified sequence provided herein comprises at least seven functional mutations relative to a targeted endogenous sequence that encodes at least seven amino acid changes in the protein encoded by a plastid gene. In one aspect, a modified sequence provided herein comprises at least eight functional mutations relative to a targeted endogenous sequence that encodes at least eight amino acid changes in the protein encoded by a plastid gene. In one aspect, a modified sequence provided herein comprises at least nine functional mutations relative to a targeted endogenous sequence that encodes at least nine amino acid changes in the protein encoded by a plastid gene. In one aspect, a modified sequence provided herein comprises at least ten functional mutations relative to a targeted endogenous sequence that encodes at least ten amino acid changes in the protein encoded by a plastid gene. In one aspect, a modified sequence provided herein comprises at least eleven functional mutations relative to a targeted endogenous sequence that encodes at least eleven amino acid changes in the protein encoded by a plastid gene. In one aspect, a modified sequence provided herein comprises at least twelve functional mutations relative to a targeted endogenous sequence that encodes at least twelve amino acid changes in the protein encoded by a plastid gene. In one aspect, a modified sequence provided herein comprises at least thirteen functional mutations relative to a targeted endogenous sequence that encodes at least thirteen amino acid changes in the protein encoded by a plastid gene. In one aspect, a modified sequence provided herein comprises at least fourteen functional mutations relative to a targeted endogenous sequence that encodes at least fourteen amino acid changes in the protein encoded by a plastid gene. In one aspect, a modified sequence provided herein comprises at least fifteen functional mutations relative to a targeted endogenous sequence that encodes at least fifteen amino acid changes in the protein encoded by a plastid gene. In one aspect, a modified sequence provided herein comprises at least sixteen functional mutations relative to a targeted endogenous sequence that encodes at least sixteen amino acid changes in the protein encoded by a plastid gene. In one aspect, a modified sequence provided herein comprises at least seventeen functional mutations relative to a targeted endogenous sequence that encodes at least seventeen amino acid changes in the protein encoded by a plastid gene. In one aspect, a modified sequence provided herein comprises at least eighteen functional mutations relative to a targeted endogenous sequence that encodes at least eighteen amino acid changes in the protein encoded by a plastid gene. In one aspect, a modified sequence provided herein comprises at least nineteen functional mutations relative to a targeted endogenous sequence that encodes at least nineteen amino acid changes in the protein encoded by a plastid gene. In one aspect, a modified sequence provided herein comprises at least twenty functional mutations relative to a targeted endogenous sequence that encodes at least twenty amino acid changes in the protein encoded by a plastid gene. In one aspect, a modified sequence provided herein comprises at least twenty-five functional mutations relative to a targeted endogenous sequence that encodes at least twenty-five amino acid changes in the protein encoded by a plastid gene. In one aspect, a modified sequence provided herein comprises at least thirty functional mutations relative to a targeted endogenous sequence that encodes at least thirty amino acid changes in the protein encoded by a plastid gene. In one aspect, a modified sequence provided herein comprises at least forty functional mutations relative to a targeted endogenous sequence that encodes at least forty amino acid changes in the protein encoded by a plastid gene. In one aspect, a modified sequence provided herein comprises at least fifty functional mutations relative to a targeted endogenous sequence that encodes at least fifty amino acid changes in the protein encoded by a plastid gene. In one aspect, a modified sequence provided herein comprises at least one functional mutation relative to a targeted endogenous sequence that affects splicing of the targeted plastid gene. In one aspect, a modified sequence provided herein comprises at least one functional mutation relative to a targeted endogenous sequence that results in truncation of the protein encoded by the targeted plastid gene.

In an aspect, a modified sequence provided herein comprises at least two functional mutations relative to the targeted endogenous sequence that encodes at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 25, at least 30, at least 40, or at least 50 amino acid changes in the protein encoded by the plastid gene.

In an aspect, a modified sequence comprises at least a portion of a plastid gene intron sequence, or a complementary sequence thereof. In an aspect, a modified sequence comprises at least one functional mutation in an intron sequence that changes the splicing or expression of a plastid gene. A modified sequence may also comprise at least one mutation in an intron sequence that reduces the sequence identity of the modified sequence with the endogenous sequence, but which does not change the function of the intron sequence. In yet a further aspect, a modified sequence comprises at least a portion of a promoter or regulatory sequence of a plastid gene, or a complementary sequence thereof. Non-limiting examples of regulatory sequences include enhancers, 5'-UTRs, intron regions, 3'-UTRs, transcribed regions, and other functional sequence regions. In a further aspect, a modified sequence comprises at least a portion of a promoter, or a complementary sequence thereof. In another aspect, a modified sequence comprises at least one functional mutation that changes the expression of a plastid gene or at least one mutation that does not change the expression of a plastid gene. A modified sequence may also comprise at least one mutation in a promoter or regulatory sequence that reduces the sequence identity of the modified sequence with the endogenous sequence, but which does not change the function of the promoter or regulatory sequence. In an aspect, a modified sequence comprises at least a portion of a plastid gene exon sequence, or a complementary sequence thereof. In an aspect, a modified sequence comprises at least one functional mutation in an exon sequence that changes the splicing or expression of a plastid gene. A modified sequence may also comprise at least one mutation in an exon sequence that reduces the sequence identity of the modified sequence with the endogenous sequence, but which does not change the function of the exon sequence.

In an aspect, a modified sequence provided herein comprises a sequence having at least 70%, at least 75%, at least 80%, at least 85%, at least 90%, at least 95%, at least 97%, at least 98%, at least 99%, or 100% sequence identity to SEQ ID NO: 1, 3, 8, or 10. In another aspect, a modified sequence encoding a protein having at least 70%, at least 75%, at least 80%, at least 85%, at least 90%, at least 95%, at least 97%, at least 98%, at least 99%, or 100% sequence identity with to SEQ ID NO: 2, 9, or 11.

Plastid genomes typically comprise approximately 30 to 50 RNA genes and up to 200 protein-encoding genes, many of which are required for photosynthesis. As used herein, a "plastid gene" refers to any protein-encoding sequence in a plastid genome. In one aspect, a targeted endogenous sequence comprises at least a portion of a plastid gene, or a sequence complementary to at least a portion of the plastid gene. In another aspect, a target plastid sequence comprises at least a portion of a coding sequence of a plastid gene, or a sequence complementary to at least a portion of the coding sequence of the plastid gene. In yet another aspect, a target plastid sequence provided herein comprises at least one functional mutation that changes the expression or activity of a plastid gene.

As used herein, a "gene" refers to a polynucleotide that can produce a functional unit (e.g., without being limiting, for example, a protein,). A gene can comprise a promoter, an enhancer sequence, a leader sequence, a transcriptional start site, a transcriptional stop site, a polyadenylation site, one or more exons, one or more introns, a 5'-UTR, a 3'-UTR, or any combination thereof. A "gene sequence" can comprise a polynucleotide sequence encoding a promoter, an enhancer sequence, a leader sequence, a transcriptional start site, a transcriptional stop site, a polyadenylation site, one or more exons, one or more introns, a 5'-UTR, a 3'-UTR, or any combination thereof. In one aspect, a gene encodes an RNA molecule or a precursor thereof. In another aspect, a gene encodes a protein. A "coding sequence" is a sequence that encodes a protein (e.g., an exon sequence) or an RNA molecule.

In an aspect, a plastid gene provided herein is atpE. In an aspect, a plastid gene provided herein is ndhC. In an aspect, a plastid gene provided herein is ndhJ. In an aspect, a plastid gene provided herein is rps4. In an aspect, a plastid gene provided herein is rps14. In an aspect, a plastid gene provided herein is psbZ. In an aspect, a plastid gene provided herein is psbD. In an aspect, a plastid gene provided herein is petN. In an aspect, a plastid gene provided herein is rps2. In an aspect, a plastid gene provided herein is atpI. In an aspect, a plastid gene provided herein is atpH. In an aspect, a plastid gene provided herein is psbI. In an aspect, a plastid gene provided herein is psbK. In an aspect, a plastid gene provided herein is psaI. In an aspect, a plastid gene provided herein is cemA. In an aspect, a plastid gene provided herein is petA. In an aspect, a plastid gene provided herein is psbJ. In an aspect, a plastid gene provided herein is psbL. In an aspect, a plastid gene provided herein is psbF. In an aspect, a plastid gene provided herein is psbE. In an aspect, a plastid gene provided herein is petL. In an aspect, a plastid gene provided herein is petG. In an aspect, a plastid gene provided herein is psaJ. In an aspect, a plastid gene provided herein is rpl33. In an aspect, a plastid gene provided herein is rps18. In an aspect, a plastid gene provided herein is psbT. In an aspect, a plastid gene provided herein is psbN. In an aspect, a plastid gene provided herein is psbH. In an aspect, a plastid gene provided herein is petB. In an aspect, a plastid gene provided herein is petD. In an aspect, a plastid gene provided herein is rpoA. In an aspect, a plastid gene provided herein is rps11. In an aspect, a plastid gene provided herein is rpl36. In an aspect, a plastid gene provided herein is rps8. In an aspect, a plastid gene provided herein is rpl14. In an aspect, a plastid gene provided herein is rps3. In an aspect, a plastid gene provided herein is rps19. In an aspect, a plastid gene provided herein is rps15. In an aspect, a plastid gene provided herein is ndhH. In an aspect, a plastid gene provided herein is ndhI. In an aspect, a plastid gene provided herein is ndhG. In an aspect, a plastid gene provided herein is ndhE. In an aspect, a plastid gene provided herein is psaC. In an aspect, a plastid gene provided herein is ccsA. In an aspect, a plastid gene provided herein is rpl32. In an aspect, a plastid gene provided herein is ycf1. In an aspect, a plastid gene provided herein is rpl23. In an aspect, a plastid gene provided herein is psbA. In an aspect, a plastid gene provided herein is matK. In an aspect, a plastid gene provided herein is rbcL. In an aspect, a plastid gene provided herein is atpB. In an aspect, a plastid gene provided herein is ndhK. In an aspect, a plastid gene provided herein is ycf3. In an aspect, a plastid gene provided herein is psaA. In an aspect, a plastid gene provided herein is psaB. In an aspect, a plastid gene provided herein is psbC. In an aspect, a plastid gene provided herein is psbM. In an aspect, a plastid gene provided herein is rpoB. In an aspect, a plastid gene provided herein is rpoC1. In an aspect, a plastid gene provided herein is rpoC2. In an aspect, a plastid gene provided herein is atpF. In an aspect, a plastid gene provided herein is atpA. In an aspect, a plastid gene provided herein is rps16. In an aspect, a plastid gene provided herein is accD. In an aspect, a plastid gene provided herein is rpl20. In an aspect, a plastid gene provided herein is clpP. In an aspect, a plastid gene provided herein is psbB. In an aspect, a plastid gene provided herein is rpl16. In an aspect, a plastid gene provided herein is rpl2. In an aspect, a plastid gene provided herein is ndhB. In an aspect, a plastid gene provided herein is rps7. In an aspect, a plastid gene provided herein is ndhA. In an aspect, a plastid gene provided herein is ndhD. In an aspect, a plastid gene provided herein is ndhF. In a further aspect, a plastid gene is selected from the group consisting of atpE, ndhC, ndhJ, rps4, rps14, psbZ, psbD, petN, rps2, atpI, atpH, psbI, psbK, psaI, cemA, petA, psbJ, psbL, psbF, psbE, petL, petG, psaJ, rpl33, rps18, psbT, psbN, psbH, petB, petD, rpoA, rps11, rpl36, rps8, rpl14, rps3, rps19, rpl23, rps15, ndhH, ndhI, ndhG, ndhE, psaC, ccsA, rpl32, ycf1, rpl23, psbA, matK, rbcL, atpB, ndhK, ycf3, psaA, psaB, psbC, psbM, rpoB, rpoC1, rpoC2, atpF, atpA, rps16, accD, rpl20, clpP, psbB, rpl16, rpl2, ndhB, rps7, ndhA, ndhD, ndhF, and rpl2.

In an aspect, a target plastid sequence comprises a sequence or a portion of a sequence of a plastid gene selected from the group consisting of atpE, ndhC, ndhJ, rps4, rps14, psbZ, psbD, petN, rps2, atpI, atpH, psbI, psbK, psaI, cemA, petA, psbJ, psbL, psbF, psbE, petL, petG, psaJ, rpl33, rps18, psbT, psbN, psbH, petB, petD, rpoA, rps11, rpl36, rps8, rpl14, rps3, rps19, rpl23, rps15, ndhH, ndhI, ndhG, ndhE, psaC, ccsA, rpl32, ycf1, rpl23, psbA, matK, rbcL, atpB, ndhK, ycf3, psaA, psaB, psbC, psbM, rpoB, rpoC1, rpoC2, atpF, atpA, rps16, accD, rpl20, clpP, psbB, rpl16, rpl2, ndhB, rps7, ndhA, ndhD, ndhF, and rpl2.

In an aspect, a first homology segment comprises a sequence or a portion of a sequence of a plastid gene selected from the group consisting of atpE, ndhC, ndhJ, rps4, rps14, psbZ, psbD, petN, rps2, atpI, atpH, psbI, psbK, psaI, cemA, petA, psbJ, psbL, psbF, psbE, petL, petG, psaJ, rpl33, rps18, psbT, psbN, psbH, petB, petD, rpoA, rps11, rpl36, rps8, rpl14, rps3, rps19, rpl23, rps15, ndhH, ndhI, ndhG, ndhE, psaC, ccsA, rpl32, ycf1, rpl23, psbA, matK, rbcL, atpB, ndhK, ycf3, psaA, psaB, psbC, psbM, rpoB, rpoC1, rpoC2, atpF, atpA, rps16, accD, rpl20, clpP, psbB, rpl16, rpl2, ndhB, rps7, ndhA, ndhD, ndhF, and rpl2.

In an aspect, a second homology segment comprises a sequence or a portion of a sequence of a plastid gene selected from the group consisting of atpE, ndhC, ndhJ, rps4, rps14, psbZ, psbD, petN, rps2, atpI, atpH, psbI, psbK, psaI, cemA, petA, psbJ, psbL, psbF, psbE, petL, petG, psaJ, rpl33, rps18, psbT, psbN, psbH, petB, petD, rpoA, rps11, rpl36, rps8, rpl14, rps3, rps19, rpl23, rps15, ndhH, ndhI, ndhG, ndhE, psaC, ccsA, rpl32, ycf1, rpl23, psbA, matK, rbcL, atpB, ndhK, ycf3, psaA, psaB, psbC, psbM, rpoB, rpoC1, rpoC2, atpF, atpA, rps16, accD, rpl20, clpP, psbB, rpl16, rpl2, ndhB, rps7, ndhA, ndhD, ndhF, and rpl2.

In one aspect, a plastid genome segment comprises at least 25 nucleotides in length. In another aspect, a plastid genome segment comprises at least 30 nucleotides in length. In another aspect, a plastid genome segment comprises at least 35 nucleotides in length. In another aspect, a plastid genome segment comprises at least 40 nucleotides in length. In another aspect, a plastid genome segment comprises at least 45 nucleotides in length. In another aspect, a plastid genome segment comprises at least 50 nucleotides in length. In another aspect, a plastid genome segment comprises at least 60 nucleotides in length. In another aspect, a plastid genome segment comprises at least 70 nucleotides in length. In another aspect, a plastid genome segment comprises at least 80 nucleotides in length. In another aspect, a plastid genome segment comprises at least 90 nucleotides in length. In another aspect, a plastid genome segment comprises at least 100 nucleotides in length. In another aspect, a plastid genome segment comprises at least 125 nucleotides in length. In another aspect, a plastid genome segment comprises at least 150 nucleotides in length. In another aspect, a plastid genome segment comprises at least 200 nucleotides in length. In another aspect, a plastid genome segment comprises at least 250 nucleotides in length. In another aspect, a plastid genome segment comprises at least 300 nucleotides in length. In another aspect, a plastid genome segment comprises at least 350 nucleotides in length. In another aspect, a plastid genome segment comprises at least 400 nucleotides in length. In another aspect, a plastid genome segment comprises at least 450 nucleotides in length. In another aspect, a plastid genome segment comprises at least 500 nucleotides in length. In another aspect, a plastid genome segment comprises at least 750 nucleotides in length. In another aspect, a plastid genome segment comprises at least 1000 nucleotides in length. In another aspect, a plastid genome segment comprises at least 1500 nucleotides in length. In another aspect, a plastid genome segment comprises at least 2000 nucleotides in length. In another aspect, a plastid genome segment comprises at least 3000 nucleotides in length. In another aspect, a plastid genome segment comprises at least 4000 nucleotides in length. In another aspect, a plastid genome segment comprises at least 5000 nucleotides in length. In an aspect, a plastid genome segment provided herein comprises at least 25, at least 30, at least 35, at least 40, at least 45, at least 50, at least 60, at least 70, at least 80, at least 90, at least 100, at least 125, at least 150, at least 200, at least 250, at least 300, at least 350, at least 400, at least 450, at least 500, at least 750, at least 1000, at least 1500, at least 2000, at least 3000, at least 4000, or at least 5000 nucleotides in length.

As used herein, a "homology sequence" or "homology arm" refers to any sequence capable of undergoing homologous recombination with a native or endogenous plastid genome sequence. The recombinant DNA molecule may comprise at least two homology sequences for homologous recombination at a particular target site or locus within a plastid. The homology sequences are positioned on either side of the sequence(s) for integration into a plastid or plastomic DNA molecule or genome. The recombinant DNA molecule may comprise a first homology sequence and a second homology sequence flanking the modified sequence. Each of these homology sequence may typically have a base pair (bp) length of up to about 5 kilobases (kb), such as in a range from about 0.1 kb to about 5 kb in length (i.e., about 100 to about 5000 nucleotides in length), or in a range from about 0.5 kb to about 2 kb in length, or in a range from about 1 kb to about 1.5 kb in length. In certain embodiments, homology sequences provided herein may be 100% homology or perfectly homologous to the corresponding endogenous plastid genomic sequence.

In one aspect, a first homology sequence comprises at least 5 nucleotides in length. In another aspect, a first homology sequence comprises at least 10 nucleotides in length. In another aspect, a first homology sequence comprises at least 15 nucleotides in length. In another aspect, a first homology sequence comprises at least 20 nucleotides in length. In another aspect, a first homology sequence comprises at least 25 nucleotides in length. In another aspect, a first homology sequence comprises at least 30 nucleotides in length. In another aspect, a first homology sequence comprises at least 35 nucleotides in length. In another aspect, a first homology sequence comprises at least 40 nucleotides in length. In another aspect, a homology sequence comprises at least 45 nucleotides in length. In another aspect, a homology sequence comprises at least 50 nucleotides in length. In another aspect, a homology sequence comprises at least 60 nucleotides in length. In another aspect, a homology sequence comprises at least 70 nucleotides in length. In another aspect, a homology sequence comprises at least 80 nucleotides in length. In another aspect, a homology sequence comprises at least 90 nucleotides in length. In another aspect, a homology sequence comprises at least 100 nucleotides in length. In another aspect, a homology sequence comprises at least 125 nucleotides in length. In another aspect, a homology sequence comprises at least 150 nucleotides in length. In another aspect, a homology sequence comprises at least 200 nucleotides in length. In another aspect, a homology sequence comprises at least 250 nucleotides in length. In another aspect, a homology sequence comprises at least 300 nucleotides in length. In another aspect, a homology sequence comprises at least 350 nucleotides in length. In another aspect, a homology sequence comprises at least 400 nucleotides in length. In another aspect, a homology sequence comprises at least 450 nucleotides in length. In another aspect, a homology sequence comprises at least 500 nucleotides in length. In another aspect, a homology sequence comprises at least 750 nucleotides in length. In another aspect, a homology sequence comprises at least 1000 nucleotides in length. In another aspect, a homology sequence comprises at least 1500 nucleotides in length. In another aspect, a homology sequence comprises at least 2000 nucleotides in length. In another aspect, a homology sequence comprises at least 3000 nucleotides in length. In another aspect, a homology sequence comprises at least 4000 nucleotides in length. In another aspect, a homology sequence comprises at least 5000 nucleotides in length.

In another aspect, this disclosure provides a recombinant nucleic acid molecule comprising, in order from 5' to 3': a first homology sequence homologous to a first endogenous plastid genome sequence, a modified sequence having at least 30%, at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% identity to an endogenous target sequence, and a second homology sequence homologous to a second endogenous plastid genome sequence, where the target plastid sequence is located in a plastid genome of a plant cell between the first plastid genome segment and the second plastid genome segment.

In another aspect, this disclosure provides a recombinant nucleic acid molecule comprising, in order from 5' to 3': a first homology sequence homologous to a first endogenous plastid genome sequence, a modified sequence having less than 30%, less than 35%, less than 40%, less than 45%, less than 50%, less than 55%, less than 60%, less than 65%, less than 70%, less than 75% less than 80%, less than 85% identical, less than 90%, or less than 95% identity to an endogenous target sequence, and a second homology sequence homologous to a second endogenous plastid genome sequence, where the target plastid sequence is located in a plastid genome of a plant cell between the first plastid genome segment and the second plastid genome segment.

The terms "percent identity" or "percent identical" as used herein in reference to two or more nucleotide or protein sequences is calculated by (i) comparing two optimally aligned sequences (nucleotide or protein) over a window of comparison, (ii) determining the number of positions at which the identical nucleic acid base (for nucleotide sequences) or amino acid residue (for proteins) occurs in both sequences to yield the number of matched positions, (iii) dividing the number of matched positions by the total number of positions in the window of comparison, and then (iv) multiplying this quotient by 100% to yield the percent identity. If the "percent identity" is being calculated in relation to a reference sequence without a particular comparison window being specified, then the percent identity is determined by dividing the number of matched positions over the region of alignment by the total length of the reference sequence. Accordingly, for purposes of the present application, when two sequences (query and subject) are optimally aligned (with allowance for gaps in their alignment), the "percent identity" for the query sequence is equal to the number of identical positions between the two sequences divided by the total number of positions in the query sequence over its length (or a comparison window), which is then multiplied by 100%. When percentage of sequence identity is used in reference to proteins it is recognized that residue positions which are not identical often differ by conservative amino acid substitutions, where amino acid residues are substituted for other amino acid residues with similar chemical properties (e.g., charge or hydrophobicity) and therefore do not change the functional properties of the molecule. When sequences differ in conservative substitutions, the percent sequence identity can be adjusted upwards to correct for the conservative nature of the substitution. Sequences that differ by such conservative substitutions are said to have "sequence similarity" or "similarity."

For optimal alignment of sequences to calculate their percent identity, various pair-wise or multiple sequence alignment algorithms and programs are known in the art, such as ClustalW or Basic Local Alignment Search Tool® (BLAST), etc., that can be used to compare the sequence identity or similarity between two or more nucleotide or protein sequences. Although other alignment and comparison methods are known in the art, the alignment and percent identity between two sequences (including the percent identity ranges described above) can be as determined by the ClustalW algorithm, see, e.g., Chenna et al., "Multiple sequence alignment with the Clustal series of programs," *Nucleic Acids Research* 31:3497-3500, 2003; Thompson et al., "Clustal W: Improving the sensitivity of progressive multiple sequence alignment through sequence weighting, position-specific gap penalties and weight matrix choice," *Nucleic Acids Research* 22:4673-4680, 1994; Larkin et al., "Clustal W and Clustal X version 2.0," *Bioinformatics* 23:2947-48, 2007; and Altschul et al., "Basic local alignment search tool." *J. Mol. Biol.* 215:403-410, 1990, the entire contents and disclosures of which are incorporated herein by reference.

As used herein, an "essentially identical" sequence refers to a sequence that is at least 95% identical to a second sequence. In some embodiments, an essentially identical sequence is at least 96%, 97%, 98%, 99% or 100% identical to a second sequence.

In an aspect, a recombinant nucleic acid molecule provided herein comprises a selectable marker gene. The selectable marker gene may be located in the recombinant nucleic acid molecule, for example between a first homology sequence or a second homology sequence. A plant selectable marker gene or transgene may include any gene conferring tolerance to a corresponding selection agent, such that plant cells transformed with the plant selectable marker transgene may tolerate and withstand the selection pressure imposed by the selection agent. As a result, modified plastomic cells are favored to grow, proliferate, develop, etc., under selection. Useful plant selectable marker genes known in the art may include those encoding proteins that confer resistance or tolerance to streptomycin or spectinomycin (e.g., aadA, spec/strep), kanamycin (e.g., nptII), hygromycin B (e.g., aph IV), gentamycin (e.g., aac3 and aacC4), and chloramphenicol (e.g., CAT). Additional examples of known plant selectable marker genes encoding proteins that confer resistance or tolerance to an herbicide or other selection agent. For example, a transcribable DNA molecule encoding 5-enolpyruvylshikimate-3-phosphate synthase (EPSPS for glyphosate tolerance; e.g., as described in U.S. Pat. Nos. 5,627,061; 5,633,435; 6,040,497; and 5,094,945, all of which are hereby incorporated by reference); a transcribable DNA molecule encoding a glyphosate oxidoreductase and a glyphosate-N-acetyl transferase (GOX; e.g., as described in U.S. Pat. No. 5,463,175; GAT described in U.S. Pat. Publ. No. 2003/0083480); a transcribable DNA molecule encoding phytoene desaturase (crtI; e.g., as described in Misawa et al., *Plant Journal,* 4:833-840, 1993 and Misawa et al., *Plant Journal,* 6:481-489, 1994 for norflurazon tolerance, incorporated herein by reference); and the bar gene (e.g., as described in DeBlock et al., *EMBO Journal,* 6:2513-2519, 1987 for glufosinate and bialaphos tolerance, incorporated herein by reference). See also, e.g., Bock, "Engineering Plastid Genomes: Methods, Tools, and Applications in Basic Research and Biotechnology," *Annu. Rev. Plant Biol.,* 66:3.1-3.31, 2015, and Ziemienowicz, "Plant selectable markers and reporter genes," *Acta Physiologiae Plantarum* 23(3):363-374, 2001, the entire contents and disclosure of which are hereby incorporated by reference.

As used herein, a "terminator sequence" refers to any nucleic acid sequence that marks the end of a gene during transcription. In an aspect, a recombinant nucleic acid molecule provided herein comprises a terminator sequence. In another aspect, a recombinant nucleic acid molecule provided herein comprises a terminator sequence, where the terminator sequence is located in the recombinant nucleic acid molecule between a modified sequence and either a first homology sequence or a second homology sequence. In a further aspect, a recombinant nucleic acid molecule comprises both a selectable marker gene and a terminator sequence. In yet a further aspect, a recombinant nucleic acid molecule comprises a terminator sequence, where the terminator sequence is located in the recombinant nucleic acid molecule between a modified sequence and a selectable marker gene. In an aspect, a terminator sequence provided herein is heterologous to a plastid genome. In another aspect, a terminator sequence provided herein is heterologous to a plant cell. The term "heterologous" can refers to a combination of two or more DNA molecules or sequences, such as a promoter and an associated transcribable DNA sequence, encoding sequence or gene, when such a combination is man-made and not normally found in nature.

In an aspect, a recombinant nucleic acid molecule provided herein comprises a promoter sequence, where the promoter sequence is located in the recombinant nucleic acid molecule between a modified sequence and either a first homology sequence or a second homology sequence. "Promoter" as used herein refers to a DNA sequence that contains an RNA polymerase binding site and/or transcription start site and assists or promotes the transcription and expression of an associated transcribable polynucleotide sequence and/or gene (or transgene). A promoter can be synthetically produced, varied, or derived from a known or naturally occurring promoter sequence or other promoter sequence. A promoter can also include a chimeric promoter comprising a combination of two or more heterologous sequences. A promoter of the present application can thus include variants of promoter sequences that are similar in composition, but not identical to, other promoter sequence (s) known or provided herein. A promoter can be classified according to a variety of criteria relating to the pattern of expression of an associated encoding or transcribable sequence or gene (including a transgene) operably linked to the promoter, such as constitutive, developmental, tissue-specific, inducible, etc. Promoters that drive expression in all or most tissues of the plant are referred to as "constitutive" promoters. Promoters that drive expression during certain periods or stages of development are referred to as "developmental" promoters. Promoters that drive enhanced expression in certain tissues of an organism relative to other tissues of the organism are referred to as "tissue-preferred" promoters. Thus, a "tissue-preferred" promoter causes relatively higher or preferential expression in a specific tissue(s) of a plant, but with lower levels of expression in other tissue(s) of the plant. Promoters that express within a specific tissue(s) of an organism, with little or no expression in other tissues, are referred to as "tissue-specific" promoters. An "inducible" promoter is a promoter that initiates transcription in response to an environmental stimulus such as heat, cold, drought, light, or other stimuli, such as wounding or chemical application. A promoter can also be classified in terms of its origin, such as being heterologous, homologous, chimeric, synthetic, etc.

In one aspect, a recombinant nucleic acid molecule provided herein comprises one or more promoter sequences. In another aspect, a recombinant nucleic acid molecule provided herein comprises at least two promoter sequences. In another aspect, a recombinant nucleic acid molecule provided herein comprises at least three promoter sequences. In an aspect, a recombinant nucleic acid molecule provided herein comprises a promoter sequence and a terminator sequence. In an aspect, a recombinant nucleic acid molecule provided herein comprises a promoter sequence and a selectable marker gene. In an aspect, a recombinant nucleic acid molecule provided herein comprises a promoter sequence, a selectable marker gene, and a terminator sequence. In one aspect, a promoter provided herein is heterologous to a plastid genome. In another aspect, a promoter provided herein is heterologous to a plant cell. In an aspect, a promoter provided herein is a constitutive promoter. In another aspect, a promoter provided herein is a tissue-preferred promoter. In an aspect, a promoter provided herein is a tissue-specific promoter. In a further aspect, a promoter provided herein is an inducible promoter. In another aspect, a promoter provided herein is a chimeric promoter. In still another aspect, a promoter provided herein is a native promoter sequence of a plastid gene. In still another aspect, a promoter provided herein is a native promoter sequence of a plastid gene in a plant cell. In an aspect, a promoter provided herein is selected from the group consisting of a constitutive promoter, a tissue-specific promoter, and an inducible promoter.

The recombinant DNA molecule may further comprise sequences for removal of one or more transgene(s) or expression cassette(s), such as a plant selectable marker transgene, or any portion or sequence thereof, after successful production and/or confirmation of a transplastomic plant(s), especially after the transgene or expression cassette is no longer needed. In some embodiments, this may be accomplished by flanking the sequence to be removed, with known of later developed recombination sites (e.g., LoxP sites, FRT sites, etc.) that can be recognized and removed by an endogenous or exogenously provided recombinase enzyme (e.g., Cre, Flp, etc.). The recombinase enzyme may be introduced and expressed in trans, such as by crossing the transplastomic plant to another plant having the recombinase transgene, to accomplish excision of the transgene. Accordingly, the unwanted sequence element or transgene can be removed once its use or purpose has expired, thus preventing its further expression or transmission in the germ line.

III. Methods for Plastid Transformation

Embodiments provide methods of replacing one or more endogenous target sequences in a plastid genome with a modified sequence into at least one plant cell through plastid transformation. Plastids are organelles comprising a circular, double-stranded genome that are found in plants, algae, and some protozoan species. Plastids can differentiate into different forms depending on their function. As used herein, a "proplastid" refers to an undifferentiated plastid. Proplastids can differentiate into etioplasts, chloroplasts, and leucoplasts. Etioplasts can differentiate into chloroplasts. Chloroplasts can differentiate into chromoplasts. Leucoplasts can differentiate into amyloplasts, elaioplasts, and proteinoplasts. In many instances, reverse differentiation is also possible (e.g., a chloroplast differentiates into an etioplast).

Without being limiting, plastids are known to perform myriad functions, including performing photosynthesis (e.g., chloroplasts), synthesizing and storing pigments (e.g., chromoplasts), dismantling photosynthetic apparatuses (e.g., gerontoplasts), monoterpene synthesis (e.g., leucoplasts), starch storage (e.g., amyloplasts), fat storage (e.g., elaioplasts), storage and modification of proteins (e.g., proteinoplasts), synthesizing tannins and polyphenols (e.g., tannosomes), gravity detection, amino acid synthesis, nucleotide synthesis, fatty acid synthesis, plant hormone synthesis, vitamin synthesis, sulfur assimilation, and nitrogen assimilation.

In an aspect, a plastid provided herein is a proplastid. In another aspect, a plastid provided herein is an etioplast. In one aspect, a plastid provided herein is a chloroplast. In another aspect, a plastid provided herein is a chromoplast. In another aspect, a plastid provided herein is a gerontoplast. In an aspect, a plastid provided herein is a leucoplast. In a further aspect, a plastid provided herein is an amyloplast. In another aspect, a plastid provided herein is an elaioplast. In an aspect, a plastid provided herein is a proteinoplast. In yet a further aspect, a plastid provided herein is a tannosome. In another aspect, a plastid provided herein is selected from the group consisting of a proplastid, an etioplast, chloroplast, a chromoplast, a gerontoplast, a leucoplast, an amyloplast, an elaioplast, a proteinoplast, and a tannosome.

In an aspect, a plastid genome provided herein is a proplastid genome. In another aspect, a plastid genome provided herein is an etioplast genome. In an aspect, a plastid genome provided herein is a chloroplast genome. In another aspect, a plastid genome provided herein is a chromoplast genome. In another aspect, a plastid genome provided herein is a gerontoplast genome. In an aspect, a plastid genome provided herein is a leucoplast genome. In a further aspect, a plastid genome provided herein is an amyloplast genome. In another aspect, a plastid genome provided herein is an elaioplast genome. In an aspect, a plastid genome provided herein is a proteinoplast genome. In yet a further aspect, a plastid genome provided herein is a tannosome genome. In another aspect, a plastid genome provided herein is selected from the group consisting of a proplastid genome, an etioplast genome, a chloroplast genome, a chromoplast genome, a gerontoplast genome, a leucoplast genome, an amyloplast genome, an elaioplast genome, a proteinoplast genome, and a tannosome genome.

Plastid genomes range in size from about 140 kilobases (kb) to about 218 kb. For example, the corn plastid genome is about 140 kb, while the soy plastid genome is about 152 kb and the cotton plastid genome is about 160 kb. Over 800 plastid genomes have been sequenced and are available online at the National Center for Biotechnology Information organelle genome database. See Daniell et al., *Genome Biology*, 17:134, 2016; and www.ncbi.nlm.nih.gov/genome/organelle, both of which are incorporated by reference herein in their entireties. The organization of plant plastid genomes is highly conserved, and most plant plastid genomes have two identical copies of a 20 kb to 30 kb inverted repeat separating a large single copy region and a small single copy region.

In one aspect, the methods provided allow for a frequency of transformation of a modified sequence into a plastid genome of a plant cell that is higher than with a control construct not comprising at least one silent mutation relative to a target plastid sequence. In an aspect, a method provided herein comprises selecting a transformed plant cell having a modified sequence in a plastid genome. In another aspect, a method provided herein comprises developing or regenerating a transformed plant from a transformed plant cell having a modified sequence in a plastid genome. In still another aspect, a method provided herein comprises selecting a transformed plant having a modified sequence in a plastid genome of at least one cell of the transformed plant. In a further aspect, a method of selecting provided herein comprises detecting the presence of a modified sequence in a plastid genome of a plant cell via molecular technique. In a further aspect, a method provided herein comprises detecting the presence of a modified sequence in a plastid genome of a plant cell via molecular technique. In an aspect, a method provided herein comprises detecting the presence of a modified sequence in a plastid genome of a plant via molecular technique. In another aspect, a method of selecting provided herein comprises detecting the presence of a modified sequence in a plastid genome of a plant via molecular technique.

In an aspect, a method provided herein comprises treating a transformed plant with a selection agent and selecting based on resistance or tolerance of the transformed plant to the selection agent. In another aspect, a method provided herein comprises treating a transformed plant cell with a selection agent and selecting based on resistance or tolerance of the transformed plant cell to the selection agent. In an aspect, a method provided herein comprises a recombinant nucleic acid molecule comprising a selectable marker gene that provides resistance or tolerance to a selection agent, where a transformed plant has the selectable marker gene in a plastid genome of the transformed plant, and where a selecting step comprises treating the transformed plant with the selection agent and selecting based on resistance or tolerance of the transformed plant to the selection agent. In an aspect, a method comprising a selecting step provided herein comprises selecting a transformed plant based on a phenotypic change caused by a modified sequence in a plastid genome of the transformed plant. Non-limiting examples of phenotypic changes include changes in leaf color (e.g., white leaves instead of green leaves); changes in starch production or storage; changes in sugar production or storage; changes in photosynthetic rate.

As used herein, a "molecular technique" refers to any method known in the fields of molecular biology, biochemistry, genetics, plant biology, or biophysics that involves the use, manipulation, or analysis of a nucleic acid, a protein, or a lipid. Without being limiting, molecular techniques useful for detecting the presence of a modified sequence in a plastid genome include phenotypic screening; molecular marker technologies such as single nucleotide polymorphism (SNP) analysis by TaqMan® or Illumina/Infinium technology; Southern blot; polymerase chain reaction (PCR); enzyme-linked immunosorbent assay (ELISA); and sequencing (e.g., Sanger, Illumina®, 454, Pac-Bio, Ion Torrent™). In one aspect, a method of detection provided herein comprises phenotypic screening. In another aspect, a method of detection provided herein comprises SNP analysis. In a further aspect, a method of detection provided herein comprises a Southern blot. In a further aspect, a method of detection provided herein comprises PCR. In an aspect, a method of detection provided herein comprises ELISA. In a further aspect, a method of detection provided herein comprises determining the sequence of a nucleic acid or a protein. Without being limiting, nucleic acids can be detected using hybridization. Hybridization between nucleic acids is discussed in detail in Sambrook et al. (Molecular Cloning: A Laboratory Manual, 2nd Ed., Cold Spring Harbor Laboratory Press, Cold Spring Harbor, NY, 1989).

Nucleic acids can be isolated using techniques routine in the art. For example, nucleic acids can be isolated using any method including, without limitation, recombinant nucleic acid technology, and/or the polymerase chain reaction (PCR). General PCR techniques are described, for example in PCR Primer: A Laboratory Manual, Dieffenbach & Dveksler, Eds., Cold Spring Harbor Laboratory Press, 1995. Recombinant nucleic acid techniques include, for example, restriction enzyme digestion and ligation, which can be used to isolate a nucleic acid. Isolated nucleic acids also can be chemically synthesized, either as a single nucleic acid molecule or as a series of oligonucleotides. Polypeptides can be purified from natural sources (e.g., a biological sample) by known methods such as DEAE ion exchange, gel filtration, and hydroxyapatite chromatography. A polypeptide also can be purified, for example, by expressing a nucleic acid in an expression vector. In addition, a purified polypeptide can be obtained by chemical synthesis. The extent of purity of a polypeptide can be measured using any appropriate method, e.g., column chromatography, polyacrylamide gel electrophoresis, or HPLC analysis.

As used herein, the term "complementary" in reference to a nucleic acid molecule refers to pairing of nucleotide bases such that A is complementary to T (or U), and G is complementary to C. Two complementary nucleic acid molecules are capable of hybridizing with each other. As non-limiting examples, the two strands (e.g., sense and anti-sense) of double stranded DNA are complementary to each other.

As used herein, the term "polypeptide" refers to a chain of at least two covalently linked amino acids. Polypeptides can be encoded by polynucleotides provided herein. An example of a polypeptide is a protein. Proteins provided herein can be encoded by nucleic acid molecules provided herein.

Polypeptides can be detected using antibodies. Techniques for detecting polypeptides using antibodies include enzyme linked immunosorbent assays (ELISAs), Western blots, immunoprecipitations and immunofluorescence. An antibody provided herein can be a polyclonal antibody or a monoclonal antibody. An antibody having specific binding affinity for a polypeptide provided herein can be generated using methods well known in the art. An antibody provided herein can be attached to a solid support such as a microtiter plate using methods known in the art.

In one aspect, a method is provided for detecting a modified plastid genome sequence comprising using an oligonucleotide probe capable of hybridizing to a modified sequence as described herein to detect the modified plastid genome sequence. In an aspect, an oligonucleotide probe is a PCR primer. In an aspect, a PCR primer serves as a starting point for DNA synthesis during an in vitro polymerase chain reaction. In another aspect, an oligonucleotide probe is capable of hybridizing to at least one silent mutation of a modified sequence. In an aspect, an oligonucleotide probe comprises a fluorophore. In another aspect, an oligonucleotide probe comprises a locked nucleic acid. In a further aspect, an oligonucleotide probe comprises a radioisotope. In another aspect, an oligonucleotide probe comprises an epitope. In still another aspect, an oligonucleotide probe comprises biotin.

In an aspect, an oligonucleotide probe provided herein comprises a sequence that is at least 70% identical or complementary to, at least 75% identical or complementary to, at least 80% identical or complementary to, at least 85% identical or complementary to, at least 90% identical or complementary to, at least 95% identical or complementary to, at least 97% identical or complementary to, at least 99% identical or complementary to, or 100% identical or complementary to SEQ ID NOs:12-17 provided herein.

In another aspect, an oligonucleotide probe is capable of hybridizing to at least two silent mutations of a modified sequence. In another aspect, an oligonucleotide probe is capable of hybridizing to at least three silent mutations of a modified sequence. In another aspect, an oligonucleotide probe is capable of hybridizing to at least four silent mutations of a modified sequence. In another aspect, an oligonucleotide probe is capable of hybridizing to at least five silent mutations of a modified sequence. In another aspect, an oligonucleotide probe is capable of hybridizing to at least six silent mutations of a modified sequence. In another aspect, an oligonucleotide probe is capable of hybridizing to at least seven silent mutations of a modified sequence. In another aspect, an oligonucleotide probe is capable of hybridizing to at least eight silent mutations of a modified sequence. In another aspect, an oligonucleotide probe is capable of hybridizing to at least nine silent mutations of a modified sequence. In another aspect, an oligonucleotide probe is capable of hybridizing to at least ten silent mutations of a modified sequence. In a further aspect, an oligonucleotide probe is capable of hybridizing to a modified sequence and a first plastid genome segment. In another aspect, an oligonucleotide probe is capable of hybridizing to a modified sequence and a second plastid genome segment.

Methods provided herein employ homologous recombination to achieve site-specific replacement of a targeted endogenous sequence in the plastid genome DNA (i.e., the "plastome") with a modified version of the targeted sequence from a recombinant DNA molecule. As described above, the recombinant DNA molecule may generally comprise two arm regions flanking the modified version of the target sequence with each of the two arm regions being homologous to respective target plastid genome sequences to drive recombination and replacement of the endogenous sequence at the target site of the plastid genome. Site-directed integration into the plastid genome of a plant cell via homologous recombination reduces event variability commonly associated with nuclear transformation events having transgene insertions at different locations throughout the nuclear genome. As a result, expression levels in plastids should generally be consistent between transplastomic events of the same quality (unlike nuclear transformation events that exhibit variable and unpredictable levels of expression depending on their insertion site). Such consistent and predictable expression reduces development costs for producing transplastomic events.

Methods of transforming plant cells are well known by persons of ordinary skill in the art. For instance, specific instructions for transforming plant cells by particle bombardment with particles (e.g., biolistic transformation) coated with recombinant DNA are found in U.S. Pat. No. 5,015,580 (soybean); U.S. Pat. No. 5,550,318 (corn); U.S. Pat. No. 5,538,880 (corn); U.S. Pat. No. 5,914,451 (soybean); U.S. Pat. No. 6,160,208 (corn); U.S. Pat. No. 6,399,861 (corn) and U.S. Pat. No. 6,153,812 (wheat); U.S. Pat. No. 6,002,070 (rice); U.S. Pat. No. 7,122,722 (cotton); U.S. Pat. No. 6,051,756 (*Brassica*); U.S. Pat. No. 6,297,056 (*Brassica*); U.S. Patent Publication No. 2004/0123342 (sugarcane). Methods for transforming other plants can be found in, for example, Compendium of Transgenic Crop Plants (2009) Blackwell Publishing. Methods specifically for the transformation of plastid genomes using biolistic transformation and PEG-mediated transformation techniques are also known in the art. For example, see Vermand Daniell, *Plant Physiology*, 145:1129-1143, 2007; Daniell et al., *Proc. Natl. Acad. Sci. USA*, 87:88-92, 1990; Sanford et al., *Methods Enzymol.* 217:483-509, 1993; O'Neill et al., *Plant J.*, 3:729-738, 1993; and Golds et al., *Nature Biotechnology*, 11:95-97, 1993, all of which are incorporated herein by reference in their entireties. Any appropriate method known to those skilled in the art can be used to transform a plant cell with any of the nucleic acid molecules provided herein.

In one aspect, a method provided herein stably transforms a plant cell. In another aspect, a method provided herein transiently transforms a plant cell. In an aspect, a method of transforming a plant cell comprises biolistic transformation. In an aspect, a method of transforming a plant cell comprises PEG-mediated transformation.

Transformation methods to provide transplastomic plant cells and transplastomic plants containing stably integrated nucleic acid molecules provided herein are preferably practiced in tissue culture on media and in a controlled environment.

In one aspect, this disclosure provides plant cells that are not reproductive material and do not mediate the natural reproduction of the plant. In another aspect, this disclosure also provides plant cells that are reproductive material and mediate the natural reproduction of the plant. In another aspect, this disclosure provides plant cells that cannot maintain themselves via photosynthesis. In another aspect, this disclosure provides somatic plant cells. Somatic cells, contrary to germline cells, do not mediate plant reproduction.

Recipient cell targets for transformation include, but are not limited to, a seed cell, a fruit cell, a leaf cell, a cotyledon cell, a hypocotyl cell, a meristem cell, an embryo cell, an endosperm cell, a root cell, a shoot cell, a stem cell, a pod cell, a flower cell, an inflorescence cell, a stalk cell, a pedicel cell, a style cell, a stigma cell, a receptacle cell, a petal cell, a sepal cell, a pollen cell, an anther cell, a filament cell, an ovary cell, an ovule cell, a pericarp cell, a phloem cell, a bud cell, or a vascular tissue cell. In another aspect, this disclosure provides a cell comprising a plastid. In another aspect, this disclosure provides a cell comprising a chloroplast. In a further aspect, this disclosure provides an epidermal cell, a stomata cell, a trichome cell, a root hair cell, a storage root cell, or a tuber cell. In another aspect, this disclosure provides a protoplast. In another aspect, this disclosure provides a plant callus cell. Any cell from which a fertile plant can be regenerated is contemplated as a useful recipient cell for practice of this disclosure. Callus can be initiated from various tissue sources, including, but not limited to, immature embryos or parts of embryos, seedling apical meristems, microspores, and the like. Those cells which are capable of proliferating as callus can serve as recipient cells for transformation. Practical transformation methods and materials for making transgenic plants of this disclosure (e.g., various media and recipient target cells, transformation of immature embryos, and subsequent regeneration of fertile transgenic plants) are disclosed, for example, in U.S. Pat. Nos. 6,194,636 and 6,232,526 and U.S. Patent Appl. Publ. No. 2004/0216189.

After transformation or bombardment, the plant tissue may be contacted with one or more selection media containing a selection agent to bias the survival, growth, proliferation and/or development of transplastomic cells having expression of a selectable marker gene integrated into the plastid genome from the recombinant DNA molecule used for transformation. The selectable marker gene will generally be paired to the selection agent used for selection such that the selectable marker gene confers tolerance to selection with the selection agent. Commonly used selectable marker genes include, without being limiting, those conferring tolerance or resistance to antibiotics, such as kanamycin and paromomycin (nptII), hygromycin B (aph IV), streptomycin or spectinomycin (aadA) and gentamycin (aac3 and aacC4), or those conferring tolerance or resistance to herbicides such as glufosinate (bar or pat), dicamba (DMO), and glyphosate (aroA or EPSPS). Selectable marker genes, which provide an ability to visually screen for transformants, can also be used. Non-limiting examples include luciferase or green fluorescent protein (GFP), or a gene expressing a beta glucuronidase or uidA gene (GUS) for which various chromogenic substrates are known.

Unless defined otherwise herein, terms are to be understood according to conventional usage by those of ordinary skill in the relevant art. Examples of resources describing many of the terms related to molecular biology used herein can be found in Alberts et al., Molecular Biology of The Cell, 5th Edition, Garland Science Publishing, Inc.: New York, 2007; Rieger et al., Glossary of Genetics: Classical and Molecular, 5th edition, Springer-Verlag: New York, 1991; King et al., A Dictionary of Genetics, 6th ed., Oxford University Press: New York, 2002; and Lewin, Genes IX, Oxford University Press: New York, 2007. The nomenclature for DNA bases as set forth at 37 C.F.R. § 1.822 is used.

The following are non-limiting exemplary embodiments of the present disclosure.

A first embodiment relates to a method of modifying a plastid genome comprising: introducing a recombinant nucleic acid molecule into a plant cell, wherein the recombinant nucleic acid molecule comprises, from 5' to 3': a first homology sequence that is homologous to a first endogenous plastid genome sequence, a modified sequence that comprises at least one silent mutation relative to a target plastid sequence, and a second homology sequence that is homologous to a second endogenous plastid genome sequence, wherein the target plastid sequence is located in a plastid genome of the plant cell between the first endogenous plastid genome sequence and the second endogenous plastid genome sequence; and allowing homologous recombination to occur such that the modified sequence replaces the target plastid sequence in the plastid genome of the plant cell.

A second embodiment relates to the method of embodiment 1, wherein the modified sequence comprises at least a second, third, fourth, fifth, sixth, seventh, eight, ninth, tenth, eleventh, twelfth, thirteenth, fourteenth, fifteenth, sixteenth, seventeenth, eighteenth, nineteenth, or twentieth silent mutation relative to the target plastid sequence.

A third embodiment relates to the method of embodiment 1, wherein the modified sequence comprises at least one functional mutation relative to the target plastid sequence.

A fourth embodiment relates to the method of embodiment 3, wherein the modified sequence comprises at least a second functional mutation relative to the target plastid sequence.

A fifth embodiment relates to the method of embodiment 1, wherein the modified sequence is at least 30%, 35%, 40%, 45%, 50%, 55%, 60%, 65%, 70%, 75%, 80%, 85%, 90%, 95%, 96%, 97%, 98%, or 99% identical to the target plastid sequence.

A sixth embodiment relates to the method of embodiment 1, wherein the first homology sequence is essentially identical to the first endogenous plastid genome sequence.

A seventh embodiment relates to the method of embodiment 1, wherein the second homology sequence is essentially identical to the second endogenous plastid genome sequence.

An eight embodiment relates to the method of embodiment 1, wherein the target plastid sequence comprises at least a portion of a plastid gene, or a sequence complementary to at least a portion of a plastid gene.

A nineth embodiment relates to the method of embodiment 1, wherein the recombinant nucleic acid molecule further comprises a selectable marker gene between the first homology sequence and the second homology sequence.

A tenth embodiment relates to the method of embodiment 9, wherein the selectable marker gene is selected from the group consisting of nptII, aph IV, aadA, aac3, aacC4, bar, pat, DMO, EPSPS, and aroA.

An eleventh embodiment relates to the method of embodiment 1, wherein the recombinant nucleic acid molecule further comprises a terminator sequence between the first homology sequence and the second homology sequence.

A twelfth embodiment relates to the method of embodiment 1, wherein the recombinant nucleic acid molecule further comprises a promoter sequence between the first homology sequence and the second homology sequence.

A thirteenth embodiment relates to the method of embodiment 1, wherein the plant cell is a monocotyledonous plant cell.

A fourteenth embodiment relates to the method of embodiment 13, wherein the monocotyledonous plant cell is a corn cell, a rice cell, a wheat cell, a barley cell, or a sugarcane cell.

A fifteenth embodiment relates to the method of embodiment 1, wherein the plant cell is a dicotyledonous plant cell.

A sixteenth embodiment relates to the method of embodiment 15, wherein the dicotyledonous plant cell is a soybean cell, an alfalfa cell, a cotton cell, a tomato cell, an *Arabidopsis* cell, or a canola cell.

A seventeenth embodiment relates to the method of embodiment 1, wherein the method further comprises the step of selecting a transformed plant cell comprising the modified sequence.

An eighteenth embodiment relates to the method of embodiment 17, wherein the selecting step comprises selecting the transformed plant cell based on a molecular technique.

A nineteenth embodiment relates to the method of embodiment 17 wherein the selecting step comprises selecting the transformed plant cell based on a phenotypic change caused by the modified sequence in the plastid genome of the transformed plant cell.

A twentieth embodiment relates to the method of embodiment 1, wherein the method further comprises regenerating a transformed plant from the transformed plant cell.

A twenty-first embodiment relates to a vector for replacing a target plastid sequence in a plant cell, wherein said plasmid vector comprises a recombinant nucleic acid molecule comprising, in order from 5' to 3': a first homology sequence, wherein the first homology sequence is homologous to a first endogenous plastid genome sequence, a modified sequence, wherein the modified sequence comprises at least one silent mutation relative to the target plastid sequence, and a second homology sequence, wherein the second homology sequence is homologous to a second endogenous plastid genome sequence, wherein the target plastid sequence is located in a plastid genome of the plant cell between the first endogenous plastid genome sequence and the second endogenous plastid genome sequence.

A twenty-second embodiment relates to a transgenic plant cell produced by the method of embodiment 1 comprising a modified sequence within a plastid genome.

A twenty-third embodiment relates to a method of modifying a plastid genome comprising: introducing a recombinant nucleic acid molecule into a plant cell, wherein the recombinant nucleic acid molecule comprises, from 5' to 3': a first homology sequence that is homologous to a first endogenous plastid genome sequence, a modified sequence that comprises at least one silent mutation every 1,000 nucleotides relative to a target plastid sequence, and a second homology sequence that is homologous to a second endogenous plastid genome sequence, wherein the target plastid sequence is located in a plastid genome of the plant cell between the first endogenous plastid genome sequence and the second endogenous plastid genome sequence; and allowing homologous recombination to occur such that the modified sequence replaces the target plastid sequence in the plastid genome of the plant cell.

A twenty-fourth embodiment relates to the method of embodiment 23, wherein the modified sequence comprises at least one silent mutation every 500 nucleotides relative to the target plastid sequence.

A twenty-fifth embodiment relates to the method of embodiment 23, wherein the modified sequence comprises at least one silent mutation every 250 nucleotides relative to the target plastid sequence.

A twenty-sixth embodiment relates to the a vector for replacing a target plastid sequence in a plant cell, wherein said plasmid vector comprises a recombinant nucleic acid molecule comprising, in order from 5' to 3': a first homology sequence, wherein the first homology sequence is homologous to a first endogenous plastid genome sequence; a modified sequence, wherein the modified sequence comprises at least one silent mutation every 1,000 nucleotides relative to the target plastid sequence; and a second homology sequence, wherein the second homology sequence is homologous to a second endogenous plastid genome sequence; wherein the target plastid sequence is located in a plastid genome of the plant cell between the first endogenous plastid genome sequence and the second endogenous plastid genome sequence.

A twenty-seventh embodiment relates to the vector of embodiment 26, wherein the modified sequence comprises at least one silent mutation every 500 nucleotides relative to the target plastid sequence.

A twenty-eighth embodiment relates to the vector of embodiment 26, wherein the modified sequence comprises at least one silent mutation every 250 nucleotides relative to the target plastid sequence.

A twenty-ninth embodiment relates to the vector of embodiment 26, wherein the modified sequence comprises at least one silent mutation every 3, 6, 9, 12, 15, 18, 21, 24, 27, 30, 33, 36, 39, 42, 45, 48, 51, 54, 60, 63, 66, 69, 72, 75, 78, 81, 84, 87, 90, 93, 96, 99, 102, 105, 108, 111, 114, 117, 120, 123, 126, 129, 132, 135, 138, 141, 144, 147, 150, 153, 156, 159, 162, 165, 168, 171, 174, 177, 180, 183, 186, 189, 192, 195, 198, 201, 204, 207, 210, 213, 216, 219, 222, 225, 228, 231, 234, 237, 240, 243, 246, 249, 252, 255, 258, 261, 264, 267, 270, 273, 276, 279, 282, 285, 288, 291, 294, 297, or 300 nucleotides relative to the target plastid sequence.

A thirtieth embodiment relates to the transgenic plant cell produced by the method of embodiment 23 comprising a modified sequence within a plastid genome.

EXAMPLES

Example 1. Creation of a Recombinant DNA Construct to Fully Replace the Wild Type rbcL Gene with a Codon-Modified rbcL Gene in Soybean Plastid The chloroplast genome is known to contain a number of genes involved in the regulation of respiration and photosynthesis in plants. These genes are of particular interest for the improvement of crop species. One such gene is the ribulose bisphosphate carboxylase large chain (rbcL) gene, which encodes the large subunit of the ribulose 1,5-bisphosphate carboxylase/oxygenase (Rubisco). Rubisco is a critical enzyme in plant photosynthesis but is believed to be relatively inefficient in $C_3$ plants, which includes a number of crop plant species. Alternatively, Rubisco in $C_4$ plants appears to have kinetic properties that are different from its $C_3$ counterparts which results in $C_4$ plants having more efficient photosynthetic processes. In view of this, the study of Rubisco and its structure and function in $C_3$ and $C_4$ plants is of interest in the field of agricultural biotechnology. Engineering crop plants to express Rubisco with improved kinetic properties has not yet been successful. Replacement of the wild type rbcL gene with a rbcL gene from a species having a more efficient Rubisco tends to result in compatibility issues with other proteins involved in the photosynthesis pathway. Introducing specific modifications to the native Rubisco large subunit via genome editing typically results in a very low number of transformants having the desired modification. In addition, due to the high sequence homology between the wild type gene and the modified gene, the modification may be removed by the cell's own DNA repair mechanisms.

Figure 2:
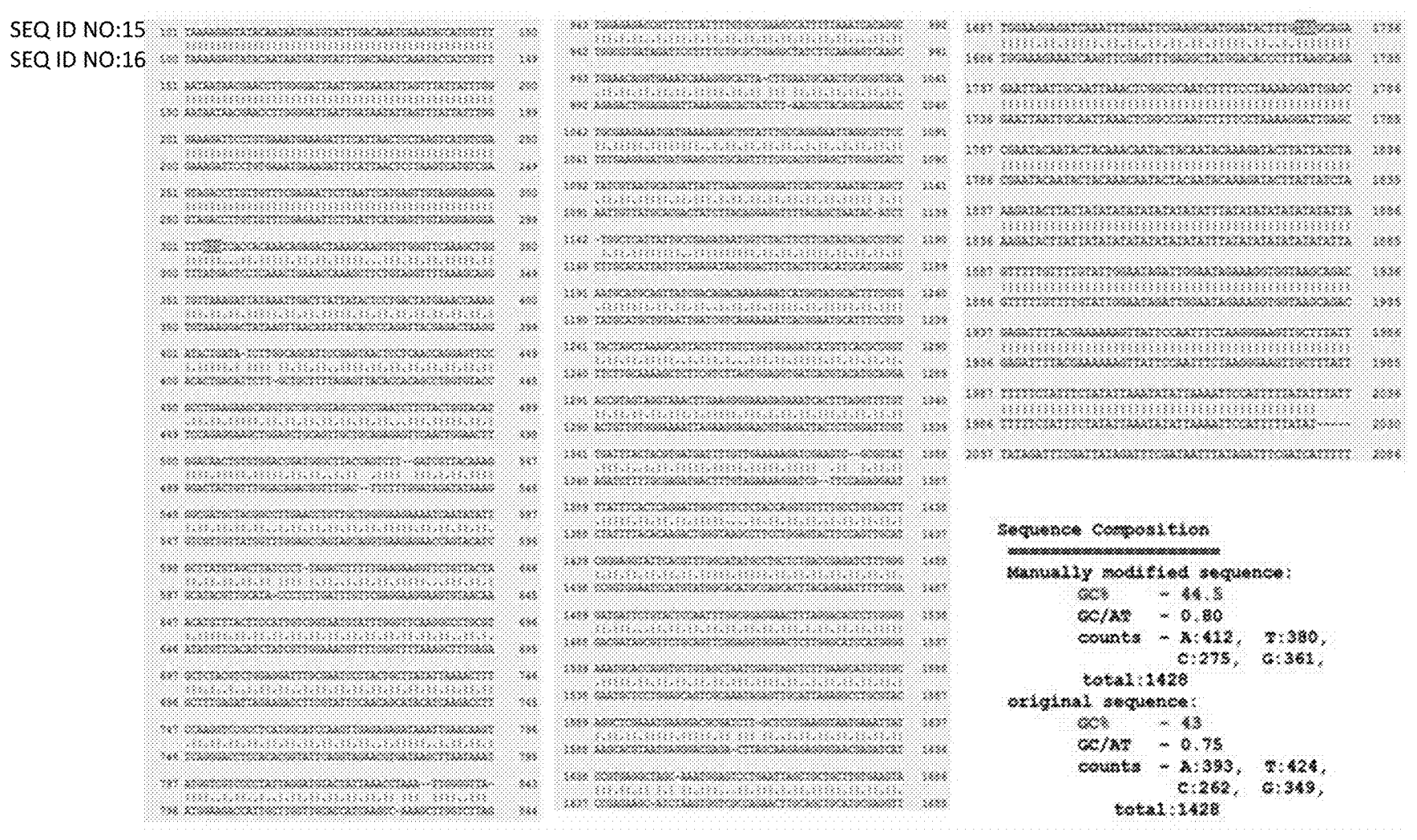

To determine if the wild type soybean rbcL gene (SEQ ID NO:1) could be efficiently replaced, a modified soybean rbcL gene sequence was designed to reduce the likelihood of recombination between the modified and endogenous rbcL sequences. Because recombination in the chloroplast occurs over regions of high sequence homology, the modified rbcL sequence was designed to have relatively low sequence homology with the wild type rbcL sequence at the nucleic acid level while still encoding the same protein. This was achieved by utilizing the degeneracy of the codons encoding amino acids. The wild type soybean rbcL gene coding sequence was evaluated to determine the codon encoding each amino acid and the frequency of each codon over the full length of the sequence (FIG. 1). The modified rbcL sequence was generated based on the codon usage frequency. For each codon in the wild type sequence, if the existing codon was not the one most frequently occurring within its respective codon family, it was replaced in the modified sequence with the synonymous codon having the most frequent usage. The resultant codon-modified soybean rbcL sequence (SEQ ID NO:3) has only about 67% sequence homology with the wild type soybean rbcL sequence but the amino acid sequences encoded by both share 100% sequence homology (FIG. 2).

A recombinant DNA construct comprising the codon-modified rbcL sequence was designed for plastid transformation. The codon-modified rbcL sequence (SEQ ID NO:3) was inserted in between the native soybean rbcL promoter (SEQ ID NO:6) and the native soybean rbcL terminator (SEQ ID NO:7) sequences. In the soybean plastid genome, the rbcL gene is located between the matK and tRNA-Lys genes on one side and the atpB gene on the other. Thus, the construct contained a 5' homology sequence (SEQ ID NO:4) and a 3' homology sequence (SEQ ID NO:5) that flanked the full rbcL sequence in order to direct recombination with the soybean plastid genome, thereby replacing the wild type rbcL sequence (SEQ ID NO:1) with the codon-modified rbcL sequence (SEQ ID NO:3). A streptomycin/spectinomycin adenylyltransferase (aadA) gene, which is a plastid-specific selectable marker gene, was inserted between the two flanking homology regions to use for selection of transformants. The aadA expression cassette was flanked by a pair of loxP sites. A diagram of the resultant recombinant DNA construct is shown in FIG. 3.

Example 2. Creation of Recombinant DNA Constructs Encoding Modified RuBisCO Proteins As described in Example 1 above, the codon-modified rbcL sequence contains multiple synonymous codon changes compared to its wild type counterpart but both sequences encode the same amino acid sequence. The codon-modified rbcL sequence was used as a template to generate modified rbcL sequences containing specific mutations in the encoded amino acid sequence.

The codon-modified rbcL sequence was modified such that the encoded amino acid sequence comprised at least two amino acid substitutions compared to the wild type/codon-modified rbcL amino acid sequence (SEQ ID NO:2). The mutant E6G-P89G coding sequence (SEQ ID NO:8) encodes a variant amino acid sequence (SEQ ID NO:9) comprising a first amino acid substitution at a position corresponding to residue 6 of SEQ ID NO:2, where the glutamic acid at this position is substituted with glycine, and a second amino acid substitution at a position corresponding to residue 89 of SEQ ID NO:2, where the proline at this position is substituted with a glycine. The mutant E6G-N95Q coding sequence (SEQ ID NO:10) encodes a variant amino acid sequence (SEQ ID NO:11) comprising a first amino acid substitution at a position corresponding to residue 6 of SEQ ID NO:2, where the glutamic acid at this position is substituted with glycine, and a second amino acid substitution at a position corresponding to residue 95 of SEQ ID NO:2, where the asparagine at this position is substituted with a glutamine. The E6G-P89G and E6G-N95Q mutant coding sequences were each cloned into transformation plasmids, along with the native soybean rbcL promoter and terminator sequences, 5' homology sequence, 3' homology sequence, and the aadA gene to produce recombinant DNA constructs similar to that described in Example 1. The aadA expression cassette is flanked by a pair of LoxP sites, which enable the selectable marker gene to be removed in transplastomic plants when such plants are crossed to plants that express Cre recombinase. A variety of methods may be employed for excision of the aadA marker gene, as described in U.S. Patent Application No. 2005/0166288, which is incorporated herein by reference in its entirety.

Example 3. Plastid Transformation

Each of the recombinant DNA constructs described in Examples 1 and 2 were transformed into soybean plastids. Methods for plastid transformation of soybean meristem explants is known in the art and was performed here essentially as described in U.S. Patent Application Publication No. 2016/0264983, which is incorporated herein by reference in its entirety.

The recombinant DNA constructs were coated on gold particles and bombarded onto 1-day or 2-day old precultured soybean explants. After transferring the bombarded explants onto resting media overnight, the explants were transferred onto selection media comprising 150 mg/L spectinomycin for two to three months under a photoperiod of 16 hours of light and 8 hours of dark. The homologous recombination between the plastid genome and the DNA constructs through the 5' and 3' flanking homology regions should replace wild type rbcL gene with the modified rbcL gene and also introduce the aadA gene into the plastid genome, thereby allowing selection of transformants. Once green shoots emerged they were sub-cultured for rooting or transferred to a greenhouse to establish regenerated soybean plants.

Example 4. Identification of Plants Comprising rbcL Gene Replacement

Figure 4:
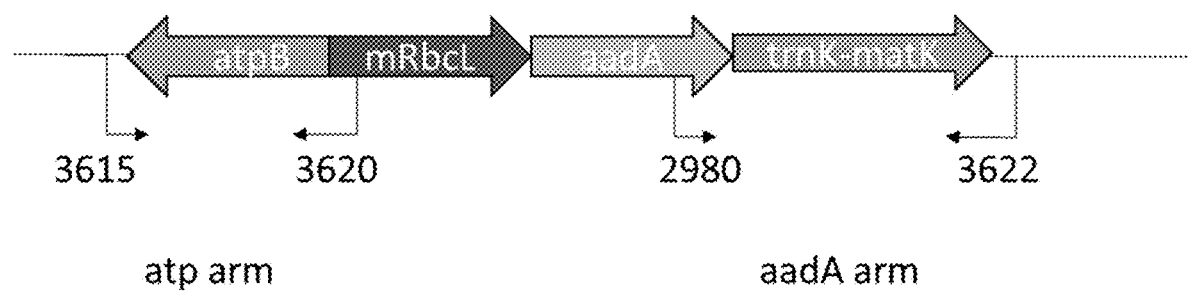
FIG. 4 depicts the location of various PCR primers used to identify modified rbcL replacement (mrbcL). Primers used include primer 3615 (SEQ ID NO:12), primer 3620 (SEQ ID NO:13), primer 2980 (SEQ ID NO:14), and primer 3622 (SEQ ID NO:15).

Leaf tip samples were collected from regenerated soybean plants obtained from Example 3. DNA was extracted from each sample and used as a template for PCR. FIG. 4 shows the position of PCR primers used, where primer 3615 (SEQ ID NO:12) and primer 3620 (SEQ ID NO:13) amplify a region containing the 5' homology arm, and primer 2980 (SEQ ID NO:14) and primer 3622 (SEQ ID NO:15) amplify a region containing the 3' homology arm. Regenerated plants were screened to confirm replacement of the wild type rbcL gene with the codon-modified rbcL gene, E6G-P89G mutant rbcL gene, or E6G-N95Q mutant rbcL gene. The results of the screen are shown in Table 1 below.

TABLE 1

Summary of rbcL gene replacement events in regenerated soybean plants

| Construct | Number of Regenerated Plants Screened | Number of Regenerated Plants Comprising rbcL Gene Replacement |
|---|---|---|
| Codon-modified rbcL | 21 | 4 |
| E6G-P89G mutant rbcL | 11 | 3 |
| E6G-N95Q mutant rbcL | 7 | 3 |

Figure 5B:
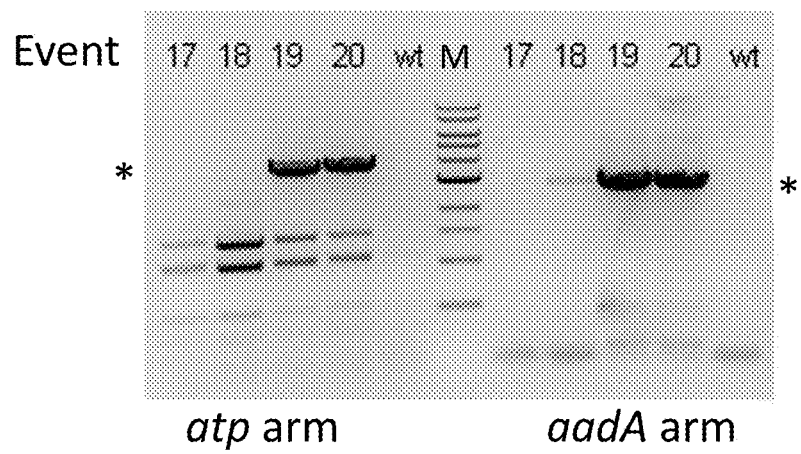
FIG. 5B depicts identification of gene replacement events for codon optimized (CM) rbcL.

Representative PCR results for each replacement event are shown in FIGS. 5A and 5B. Sequencing of the PCR products confirmed the presence of the E6G-N95Q and E6G-P89G mutant rbcL replacement events in regenerated soybean plants.

The invention claimed is:

1. A method of modifying a target plastid sequence comprising at least a portion of a plastid gene, or a sequence complementary to at least a portion of a plastid gene in a plastid genome comprising:
   a) introducing a recombinant nucleic acid molecule into a plant cell, wherein the recombinant nucleic acid molecule comprises, from 5' to 3':
      i) a first homology sequence that is homologous to a first endogenous plastid genome sequence;
      ii) a modified target plastid sequence that comprises at least one silent mutation relative to the target plastid sequence, such that the modified target plastid sequence has a sequence identity of less than 70% with the target plastid sequence, while encoding a same or similar amino acid sequence encoded by the plastid gene and such that the modified target plastid sequence comprises at least one silent mutation every 15 nucleotides relative to the target plastid sequence; and
      iii) a second homology sequence that is homologous to a second endogenous plastid genome sequence,
   wherein the target plastid sequence is located in a plastid genome of the plant cell between the first endogenous plastid genome sequence and the second endogenous plastid genome sequence; and
   b) allowing homologous recombination to occur such that the modified target plastid sequence replaces the target plastid sequence in the plastid genome of the plant cell.

2. The method of claim 1, wherein the modified target plastid sequence comprises at least one functional mutation relative to the target plastid sequence.

3. The method of claim 2, wherein the modified target plastid sequence comprises at least a second functional mutation relative to the target plastid sequence.

4. The method of claim 1, wherein the first homology sequence is identical to the first endogenous plastid genome sequence.

5. The method of claim 1, wherein the second homology sequence is identical to the second endogenous plastid genome sequence.

6. The method of claim 1, wherein the recombinant nucleic acid molecule further comprises a selectable marker gene between the first homology sequence and the second homology sequence.

7. The method of claim 6, wherein the selectable marker gene is selected from the group consisting of nptII, aph IV, aadA, aac3, aacC4, bar, pat, DMO, EPSPS, and aroA.

8. The method of claim 1, wherein the recombinant nucleic acid molecule further comprises a terminator sequence between the first homology sequence and the second homology sequence.

9. The method of claim 1, wherein the recombinant nucleic acid molecule further comprises a promoter sequence between the first homology sequence and the second homology sequence.

10. The method of claim 1, wherein the plant cell is a monocotyledonous plant cell.

11. The method of claim 10, wherein the monocotyledonous plant cell is a corn cell, a rice cell, a wheat cell, a barley cell, or a sugarcane cell.

12. The method of claim 1, wherein the plant cell is a dicotyledonous plant cell.

13. The method of claim 12, wherein the dicotyledonous plant cell is a soybean cell, an alfalfa cell, a cotton cell, a tomato cell, an *Arabidopsis* cell, or a canola cell.

14. The method of claim 1, wherein the method further comprises the step of:
 c) selecting a transformed plant cell comprising the modified target plastid sequence.

15. The method of claim 14, wherein the selecting step comprises selecting the transformed plant cell based on a molecular technique.

16. The method of claim 14 wherein the selecting step comprises selecting the transformed plant cell based on a phenotypic change caused by the modified target plastid sequence in the plastid genome of the transformed plant cell.

17. The method of claim 1, wherein the method further comprises:
 c) regenerating a transformed plant from the transformed plant cell.

18. A transgenic plant cell produced by the method of claim 1 comprising a modified target plastid sequence within a plastid genome.

19. The method of claim 1, wherein the plastid gene is selected from the group consisting of atpE, ndhC, ndhl, rps4, rps14, psbZ, psbD, petN, rps2, atpI, atpH, psbI, psbK, psaI, cemA, petA, psbI, psbL, psbF, psbE, petL, petG, psaI, rpl33, rpsl 8, psbT, psbN, psbH, petB, petD, rpoA, rpsll, rpl36, rps8, rpl14, rps3, rps19, rpl23, rps15, ndhH, ndhI, ndhG, ndhE, psaC, ccsA, rpl32, ycfl, rpl23, psbA, matK, rbcL, atpB, ndhK, ycf3, psaA, psaB, psbC, psbM, rpoB, rpoCJ, rpoC2, atpF, atpA, rps16, accD, rpl20, clpP, psbB, rpl16, rpl2, ndhB, rps7, ndhA, ndhD, ndhF, and rpl2.

20. The method of claim 1, wherein the plastid gene is rbcL.

21. The transgenic plant cell of claim 18, wherein the plastid gene is selected from the group consisting of atpE, ndhC, ndhl, rps4, rps14, psbZ, psbD, petN, rps2, atpI, atpH, psbI, psbK, psaI, cemA, petA, psbI, psbL, psbF, psbE, petL, petG, psaI, rpl33, rpsl 8, psbT, psbN, psbH, petB, petD, rpoA, rpsll, rpl36, rps8, rpl14, rps3, rps19, rpl23, rps15, ndhH, ndhI, ndhG, ndhE, psaC, ccsA, rpl32, ycfl, rpl23, psbA, matK, rbcL, atpB, ndhK, ycf3, psaA, psaB, psbC, psbM, rpoB, rpoCJ, rpoC2, atpF, atpA, rpsl6, accD, rpl20, clpP, psbB, rpl16, rpl2, ndhB, rps7, ndhA, ndhD, ndhF, and rpl2.

22. The transgenic plant cell of claim 18, wherein the plastid gene is rbcL.

* * * * *